(12) United States Patent
Nishi et al.

(10) Patent No.: US 8,704,971 B2
(45) Date of Patent: Apr. 22, 2014

(54) LIQUID CRYSTAL DISPLAY DEVICE AND MANUFACTURING METHOD THEREOF

(75) Inventors: Takeshi Nishi, Kanagawa (JP); Tetsuji Ishitani, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 13/587,987

(22) Filed: Aug. 17, 2012

(65) Prior Publication Data

US 2012/0307188 A1 Dec. 6, 2012

Related U.S. Application Data

(62) Division of application No. 12/755,603, filed on Apr. 7, 2010, now Pat. No. 8,269,943, which is a division of application No. 12/058,419, filed on Mar. 28, 2008, now Pat. No. 7,728,948.

(30) Foreign Application Priority Data

Apr. 26, 2007 (JP) .................................. 2007-116293

(51) Int. Cl.
*G02F 1/1333* (2006.01)
(52) U.S. Cl.
USPC .............................................. 349/58; 349/60
(58) Field of Classification Search
USPC ..................................................... 349/58, 60
See application file for complete search history.

(56) References Cited

U.S. PATENT DOCUMENTS

| | | | |
|---|---|---|---|
| 5,995,189 A | 11/1999 | Zhang | |
| 6,704,072 B2 | 3/2004 | Jeong et al. | |
| 7,199,855 B2 * | 4/2007 | Yoshimi et al. | 349/187 |
| 7,486,368 B2 | 2/2009 | Sakakura et al. | |
| 7,491,106 B2 | 2/2009 | Seki et al. | |
| 2003/0164681 A1 * | 9/2003 | Fukuoka et al. | 313/512 |
| 2007/0052908 A1 | 3/2007 | Jang | |
| 2007/0132906 A1 * | 6/2007 | Shen et al. | 349/58 |
| 2009/0322979 A1 * | 12/2009 | Kang et al. | 349/58 |

FOREIGN PATENT DOCUMENTS

| | | |
|---|---|---|
| CN | 1380634 | 11/2002 |
| EP | 1 235 100 A2 | 8/2002 |
| JP | 04-107523 | 4/1992 |
| JP | 09-179130 | 7/1997 |

(Continued)

OTHER PUBLICATIONS

Chinese Office Action (Application No. 2008100088430.8; CN10556) dated Oct. 26, 2010, with English translation.

(Continued)

*Primary Examiner* — Eric Wong
(74) *Attorney, Agent, or Firm* — Nixon Peabody LLP; Jeffrey L. Costellia

(57) ABSTRACT

In a method for manufacturing a liquid crystal display device in which a liquid crystal layer is formed by dropping liquid crystal by a dropping method, a surface of a sealant which is formed over a first substrate is cured by a first cure treatment before dropping the liquid crystal, and then the liquid crystal is dropped. A second substrate has a plurality of projections in a sealant adhesive region. The first substrate and the second substrate are attached to each other with the liquid crystal interposed therebetween so that the plurality of projections is in contact with an uncured region in the sealant formed over the first substrate.

9 Claims, 18 Drawing Sheets

(56) References Cited

FOREIGN PATENT DOCUMENTS

| JP | 2965645 | 10/1999 |
|---|---|---|
| JP | 2000-193981 | 7/2000 |
| JP | 2003-066467 | 3/2003 |
| JP | 2005-115255 | 4/2005 |
| JP | 2005-321455 | 11/2005 |
| JP | 2005-326472 | 11/2005 |
| JP | 2006-194920 | 7/2006 |
| JP | 2007-072457 A | 3/2007 |

OTHER PUBLICATIONS

Korean Office Action (Application No. 2008-0029567) Dated Jan. 13, 2014.

* cited by examiner

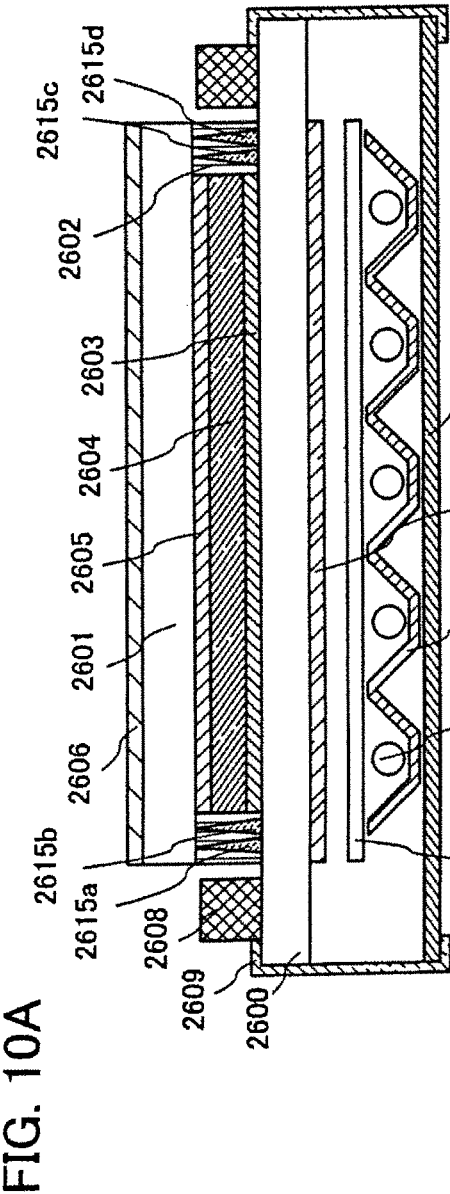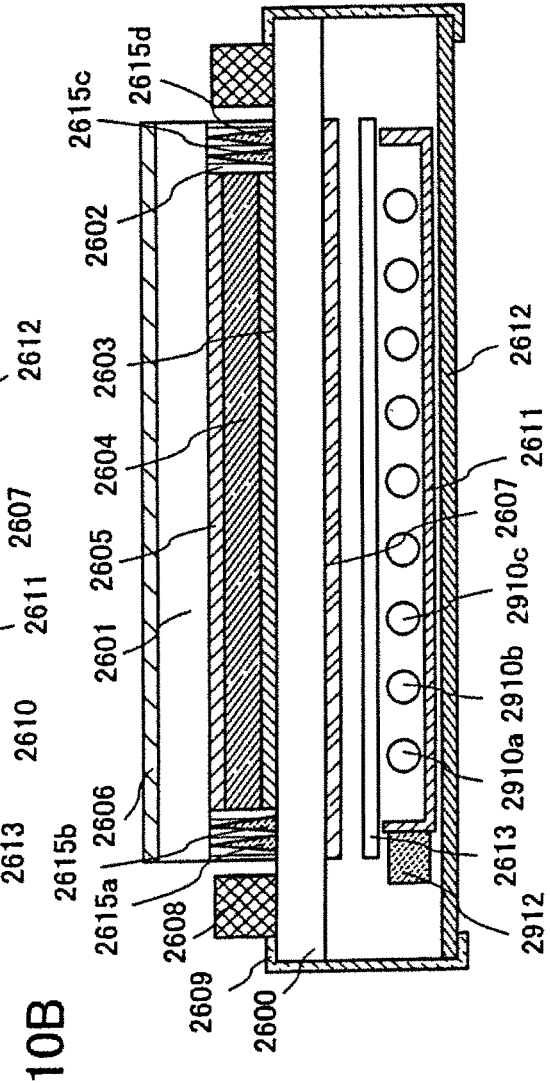
FIG. 10A
FIG. 10B

LIQUID CRYSTAL DISPLAY DEVICE AND MANUFACTURING METHOD THEREOF

BACKGROUND OF THE INVENTION

1. Field of the Invention

The present invention relates to a liquid crystal display device and a manufacturing method thereof.

2. Description of the Related Art

In recent years, a liquid crystal display device is used in a wide range of fields such as a liquid crystal television, a PDA, a mobile phone, and office automation equipment like a personal computer, as well as a clock and a calculator.

In a liquid crystal display device, liquid crystal is sealed between two substrates. When voltage is applied, an orientation of liquid crystal molecules is changed and light transmittance thereof is changed, so that an image or the like is displayed optically.

An image quality and reliability of the liquid crystal display device are largely affected by whether the two substrates are attached to each other with good adhesion with the same interval or not. A technique to reduce unevenness of a sealant caused by a wiring which is under the sealant by formation of a dummy wiring and to keep the interval between the substrates has been reported (see Patent Document 1: Japanese Published Patent Application No. H9-179130).

As a method for forming a liquid crystal layer in the liquid crystal display device, a dipping method in which liquid crystal is injected with the use of capillary phenomenon after attachment of a pair of substrates (also referred to as a pumping method or a vacuum injection method) and a liquid crystal dropping method in which liquid crystal is sealed by a dropping method are given. Time required for a process can be shortened and productivity can be improved in a liquid crystal dropping method as compared to a dipping method.

However, when a liquid crystal dropping method is used, since an uncured sealant and liquid crystal is in contact with each other, there has been a problem in that the liquid crystal is contaminated by the sealant and a sealant with little contamination of liquid crystal has been developed (for example, see Patent Document 2: Japanese Published Patent Application No. 2005-115255).

SUMMARY OF THE INVENTION

It is an object of the present invention to provide a liquid crystal display device in which deterioration of liquid crystal caused in a manufacturing process is prevented and which has good adhesion between substrates, high reliability and high image quality. It is another object of the present invention to provide a technique by which such a liquid crystal display device with high reliability and high image quality is manufactured with high productivity.

According to a feature of the present invention, in a liquid crystal display device, a plurality of projections are provided in a sealant adhesive region over a substrate and a pair of substrates are attached to each other so that the plurality of projections is implanted in the sealant. Since an area in which the sealant is in contact with the substrates is increased by the plurality of projections which is implanted in the sealant, a pair of the substrates are attached more firmly to each other and adhesion is improved.

A surface of an uncured sealant formed over a first substrate is cured by a first cure treatment before dropping liquid crystal in a method for manufacturing a liquid crystal display device in which the liquid crystal is dropped by a dropping method to form the liquid crystal layer. After dropping the liquid crystal, the first substrate and the second substrate are attached to each other with the liquid crystal interposed therebetween. Then, the sealant is subjected to a second cure treatment to be cured wholly. In the present invention, the second substrate has the plurality of projections in a sealant adhesive region. The first substrate and the second substrate are attached to each other with the liquid crystal interposed therebetween so that the plurality of projections is implanted in the sealant formed over the first substrate.

Since a surface of the sealant is cured by the first cure treatment (also referred to as a temporary cure treatment), the liquid crystal is not in contact with the uncured sealant. Accordingly, contamination of the liquid crystal due to the uncured sealant can be prevented. Therefore, reduction in reliability of the liquid crystal display device caused by deterioration of the liquid crystal can be prevented and a high quality image with reduced display unevenness and a reduced display defect can be displayed. In the present invention, the first cure treatment by which the surface of the sealant is cured is to lower reactivity of a region of the sealant which is in contact with the liquid crystal and to inactivate the region at least as compared to an uncured sealant right after formation of the sealant. Accordingly, at least the surface of the sealant which is in contact with the liquid crystal is cured and reactivity to the liquid crystal is lowered by the first cure treatment.

Although reactivity of the sealant to the liquid crystal can be lowered in curing the sealant, adhesion with a counter substrate to be attached is also lowered. In the present invention, the surface of the sealant is cured by the first cure treatment; however, an inside of the sealant is still in an uncured state in which adhesiveness is high. Since a sealant adhesive region of the second substrate is provided with the plurality of projections, when the first substrate and the second substrate are attached to each other, the plurality of projections is implanted in the sealant. The projections physically destroy the surface of the sealant of which adhesiveness is lowered by cure treatment and penetrate the inside of the sealant, so that the projections can be in contact with the uncured sealant with high adhesiveness. Accordingly, the second cure treatment is performed in a state where the plurality of projections is implanted in the sealant and the sealant is wholly cured, whereby the first substrate and the second substrate can be attached firmly to each other and can stick to each other. Adhesiveness between the first substrate and the second substrate can be improved and reliability of the liquid crystal display device can be improved.

Deterioration of the liquid crystal which is caused in the manufacturing process of the liquid crystal display device of the present invention can be prevented and the liquid crystal display device can have good adhesion between substrates and high reliability and display a high-quality image. Further, such a liquid crystal display device which has high reliability and displays a high-quality image can be manufactured with high productivity.

In the present invention, a cure treatment is performed at least twice or more; the first cure treatment is a treatment in which only the surface of the sealant is cured and the second cure treatment is a treatment in which the sealant is wholly cured in a state where the projections are implanted in the sealant. Each of the first cure treatment and the second cure treatment may be performed once or a plurality of times. As for the method for cure treatment, the same treatment may be performed (for example, light irradiation treatment is performed twice) or the different treatments may be performed (for example, the first is light irradiation treatment and the second is heat treatment) in the cure treatments.

As the cure treatment, light irradiation treatment using ultraviolet rays, or the like or heat treatment may be performed. When an ultraviolet curing resin is used as the sealant, the ultraviolet curing resin is cured by an ultraviolet irradiation treatment. When a thermosetting resin is used, heat treatment may be performed. In addition, heat treatment may be performed to the ultraviolet curing resin.

The plurality of projections preferably have shapes with a function as a wedge so that the projections are easily implanted in the sealant and adhesion between the projections and the sealant is improved. A pyramid shape such as a pointed needle-like shape (e.g. a cone shape and a polygonal pyramid), a triangular pole of which side surface is provided so as to be in contact with the substrate, or the like can be used.

In the present invention, a liquid crystal element is used as a display element and can be used for the liquid crystal display device which has a display function. Note that the display device may also indicate a display panel itself where a plurality of pixels including display elements such as liquid crystal elements and a peripheral drive circuit for driving the pixels are formed over a substrate. Further, the display device may include a display panel to which a flexible printed circuit (FPC) or a printed wiring board (PWB) having an IC, a resistor, a capacitor, an inductor, or a transistor may be attached. Such a display device may also include an optical sheet such as a polarizing plate or a retardation plate. Furthermore, it may include a backlight unit (which may include a light guide plate, a prism sheet, a diffusion sheet, a reflective sheet, and a light source (e.g., an LED or a cold-cathode tube)).

As a liquid crystal display device using a liquid crystal element, a transmissive liquid crystal display device, a semi-transmissive liquid crystal display device and a reflective liquid crystal display device can be given.

One aspect of a method for manufacturing a liquid crystal display device of the present invention includes the steps of forming a sealant over a first substrate; curing a surface of the sealant by performing a first cure treatment to the sealant; dropping liquid crystal to the first substrate; attaching the first substrate and a second substrate of which sealant adhesive region is provided with a plurality of projections to each other with the sealant so that the plurality of projections is in contact with an uncured region in the sealant with the liquid crystal interposed therebetween; and curing the uncured region in the sealant by performing a second cure treatment to the sealant.

Another aspect of a method for manufacturing a liquid crystal display device of the present invention includes the steps of forming a sealant over a first substrate; curing a surface of the sealant by performing a first ultraviolet irradiation treatment to the sealant; dropping liquid crystal to the first substrate; attaching the first substrate and a second substrate of which sealant adhesive region is provided with the plurality of projections to each other with the sealant so that the plurality of projections is in contact with an uncured region in the sealant with the liquid crystal interposed therebetween; and curing the uncured region in the sealant by performing a second ultraviolet irradiation treatment to the sealant.

Another aspect of a method for manufacturing a liquid crystal display device of the present invention includes the steps of forming a sealant over a first substrate; curing a surface of the sealant by performing a first heat treatment to the sealant; dropping liquid crystal over the first substrate; attaching the first substrate and a second substrate of which sealant adhesive region is provided with the plurality of projections to each other with the sealant so that the plurality of projections is in contact with an uncured region in the sealant with the liquid crystal interposed therebetween; and curing the uncured region in the sealant by performing a second heat treatment to the sealant.

One aspect of a liquid crystal display device of the present invention is that a pair of substrates are attached to each other with liquid crystal interposed therebetween with a sealant, the plurality of projections formed over one of a pair of the substrates are implanted in the sealant and a material of the plurality of projections is different from that of a substrate which is provided with the plurality of projections.

Another aspect of a liquid crystal display device of the present invention is that the liquid crystal display device includes a pixel region where a spacer is provided and an sealant adhesive region which is provided with the plurality of projections, a pair of substrates are attached to each other with liquid crystal interposed therebetween using the sealant, a plurality of projections formed over one of a pair of the substrates are implanted in the sealant and a material of the plurality of projections is different from that of a substrate which is provided with the plurality of projections.

In the above structure, in the case of a transmissive liquid crystal display device using a light source (e.g. backlight), a pair of the light-transmitting substrates (the first substrate and the second substrate) are used and light from a light source may be transmitted to a viewing side. On the other hand, in the case of a reflective liquid crystal display device, one of electrodes with which a pair of the substrates (the first substrate and the second substrate) are provided may have a reflective property. For example, a material having a reflective property may be used for a pixel electrode layer.

The liquid crystal may be dropped to an element substrate over which a semiconductor element, and the like are formed or a counter substrate. A process of attaching may be conducted under a reduced pressure. Note that the liquid crystal may be dropped to the substrate over which the sealant is formed or the substrate over which the plurality of projections is formed. Further, in dropping the liquid crystal, the liquid crystal may be heated and the viscosity of the liquid crystal may be lowered. After attaching the substrates to each other and curing the sealant, heat treatment may be performed. Orientation disorder of the liquid crystal can be corrected by heat treatment.

Since a surface of the sealant is cured by the first cure treatment (also referred to as a temporary cure treatment) before dropping the liquid crystal in the present invention, the liquid crystal is not in contact with the uncured sealant. Accordingly, contamination of the liquid crystal due to the uncured sealant can be prevented. Therefore, reduction in reliability of the liquid crystal display device caused by deterioration of the liquid crystal can be prevented. The liquid crystal display device with reduced display unevenness, a reduced display defect and high image quality can be realized.

The plurality of projections is provided in an sealant adhesive region in the second substrate and the plurality of projections is implanted in the sealant, so that the first substrate and the second substrate are attached to each other. The plurality of projections physically destroy the surface of the sealant of which adhesiveness is lowered by cure treatment and penetrate the inside of the sealant, so that the projections can be in contact with the uncured sealant with high adhesiveness. Accordingly, the second cure treatment is performed in a state where the plurality of projections is implanted in the sealant and the sealant is wholly cured, whereby the first substrate and the second substrate can be attached firmly to each other and can stick to each other.

Accordingly, in the liquid crystal display device of the present invention, deterioration of the liquid crystal which is caused in a manufacturing process can be prevented. Further, the liquid crystal display device with good adhesion between substrates, high reliability and high image quality can be realized. Moreover, by the present invention, such a liquid crystal display device which has high reliability and displays a high-quality image can be manufactured with high productivity.

BRIEF DESCRIPTION OF THE DRAWINGS

In the accompanying drawings:

FIGS. 10A and 10B are cross sectional views illustrating a liquid crystal display module of the present invention;

DETAILED DESCRIPTION OF THE INVENTION

Figures 1, 1A:
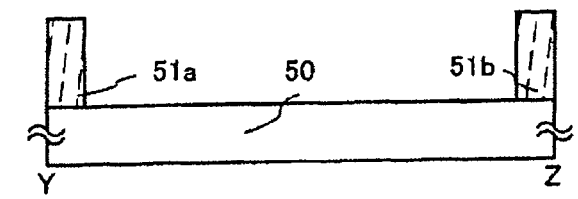
FIGS. 1A-1 to 1E-2 are conceptual views of the present invention.

Hereinafter, embodiment modes of the present invention will be described with reference to the accompanying drawings. However, it is easily understood by a person skilled in the art that the present invention can be carried out in many different modes, and the mode and the detail of the present invention can be variously changed without departing from the spirit and the scope thereof. Therefore, the present invention is not interpreted as being limited to the description of the following embodiment modes. Note that the same reference numeral may be used to denote the same portions or portions having similar functions in different diagrams for explaining the structure of the embodiment modes with reference to drawings, and repetitive explanation thereof is omitted.

Embodiment Mode 1

In this embodiment mode, an example of a liquid crystal display device in which deterioration of liquid crystal caused in a manufacturing process is prevented and which has higher reliability, higher image quality, and good adhesion between substrates, and the manufacturing method thereof will be described.

Figures 1, 1A, 2:
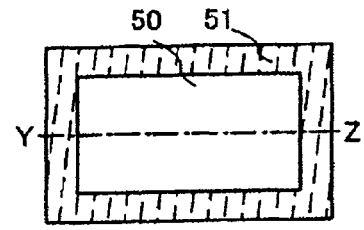
Figures 1, 1B:
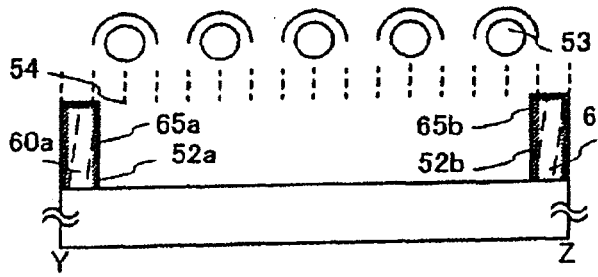
Figures 1, 1B, 2:
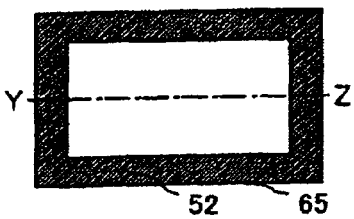
Figures 1, 1C:
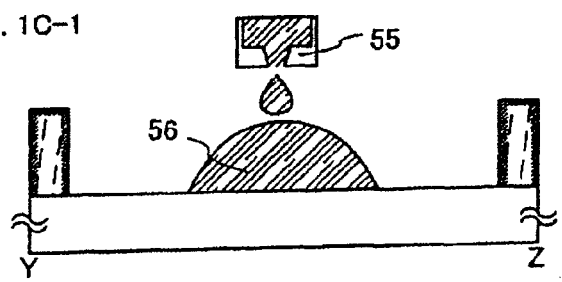
Figures 1, 1C, 2:
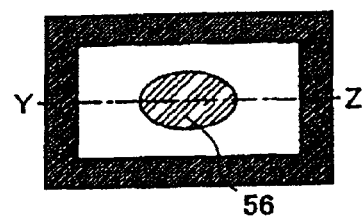
Figures 1, 1D:
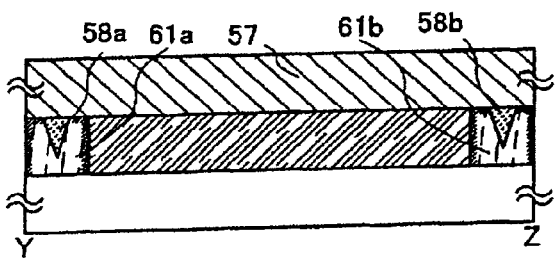
Figures 1, 1D, 2:
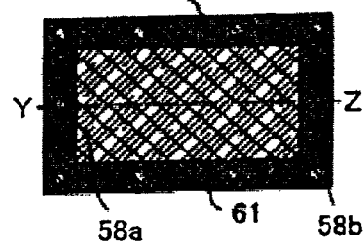
Figures 1, 1E:
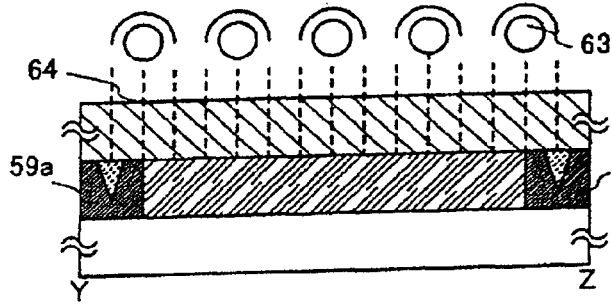
Figures 1, 1E, 2:
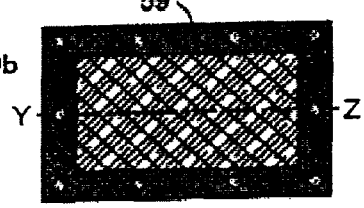

FIGS. 1A-1 to 1E-2 illustrate a method for manufacturing a liquid crystal display device in this embodiment mode using the present invention. FIGS. 1A-2 to 1E-2 are top views of a liquid crystal display device in this embodiment mode. FIGS. 1A-1 to 1E-1 are cross sectional views taken along lines Y-Z of FIGS. 1A-2 to 1E-2, respectively.

In FIGS. 1A-1 and 1A-2, an uncured sealant 51 (51a and 51b) is formed to have a frame-shaped seal pattern over a first substrate 50. In this embodiment mode, an example is described in which an ultraviolet curing resin is used as the sealant 51; therefore, the sealant 51 (51a and 51b) is irradiated with ultraviolet rays (also referred to as ultraviolet light) 54 from a light source 53, and only a surface of the sealant 51 (51a and 51b) is cured as a first cure treatment. As illustrated in FIGS. 1B-1 and 1B-2, the sealant 51 (51a and 51b) is to be a sealant 65 (65a and 65b) of which surface is a cured region 52 (52a and 52b) by irradiation with ultraviolet rays 54 and of which inside is an uncured region (60a and 60b).

In the present invention, in the first cure treatment, the sealant is not wholly cured. The cure treatment is performed such that the uncured region remains inside the sealant. Accordingly, the surface of the sealant 65 (65a and 65b) is to be the cured region 52 (52a and 52b), and the inside of the sealant 65 (65a and 65b) is kept the uncured region 60a and 60b. Since the reactivity of the cured region 52 (52a and 52b) with other substances is lowered due to being cured, even if the cured region 52 (52a and 52b) is in contact with liquid crystal, the cured region 52 (52a and 52b) does not easily react with the liquid crystal. The cured region 52 (52a and 52b) can block contaminant (such as solvent or gas) which is discharged from the sealant to the liquid crystal and can prevent contamination of the liquid crystal. Accordingly, deterioration of the liquid crystal by the sealant can be prevented. In this embodiment mode, irradiation with ultraviolet rays is performed from above of the sealant 51 and the cure treatment is performed to the whole surface of the sealant 51. Only a surface of the sealant 51 which is in contact with the liquid crystal may be cured as selected.

Liquid crystal 56 is dropped from a drop device 55 into the seal pattern of the sealant 65 (see FIGS. 1C-1 and 1C-2). Next, the first substrate 50 and a second substrate are attached to each other with the liquid crystal interposed therebetween (see FIGS. 1D-1 and 1D-2). A plurality of projections 58a and 58b are provided in a sealant adhesive region of the second substrate 57. The plurality of projections 58a and 58b are examples of those having a pointed needle shape. The second substrate 57 is attached to the first substrate 50 such that the projections 58a and 58b penetrate the cured region 52 (52a and 52b) in the sealant 65 and enter the uncured region 60 (60a and 60b) inside the sealant 65. The shape of the sealant 65 is changed by pressing of the second substrate 57 to be a sealant 61 (61a and 61b), and the liquid crystal spreads so as to fill the inside of the seal pattern. In this embodiment mode, since a surface of the sealant 61 (61a and 61b) is a cured region, even if the surface of the sealant 61 (61a and 61b) is in contact with the liquid crystal, the sealant does not have a bad influence on the liquid crystal. Further, the second substrate 57 can be in contact with the uncured region with high adhesion using the plurality of projections 58a and 58b.

A second cure treatment is performed in a state where the plurality of projections 58a and 58b are implanted in the sealant 61, so that the sealant 61 is wholly cured. In this embodiment mode, an ultraviolet irradiation treatment is performed as the second cure treatment. The sealant 61 (61a and 61b) is irradiated with ultraviolet rays 64 from a light source 63, so that the uncured region in the sealant 61 (61a and 61b) is cured and a sealant 59 which is cured as a whole is made (see FIGS. 1E-1 and 1E-2).

Accordingly, the second cure treatment is performed in a state where the plurality of projections 58a and 58b are implanted in the sealant 61 (61a and 61b), the sealant is wholly cured to make the sealant 59, whereby the first substrate 50 and the second substrate 57 can be attached firmly and can stick to each other. Accordingly, adhesion between the first substrate 50 and the second substrate 57 can be improved, and reliability of the liquid crystal display device can be improved.

In this embodiment mode, cure treatment is performed at least twice or more; the first cure treatment is treatment in which only the surface of the sealant is cured, and the second cure treatment is treatment in which the sealant is wholly cured in a state where the projections are implanted in the sealant. Each of the first cure treatment and the second cure treatment may be performed once or a plurality of times. The same treatment may be performed (for example, light irradiation treatment is performed twice) or the different treatments may be performed (for example, the first is light irradiation treatment and the second is heat treatment) as the cure treatments.

As the cure treatment, light irradiation treatment using ultraviolet rays, or the like or heat treatment may be performed. When an ultraviolet curing resin is used as the sealant, the ultraviolet curing resin is cured by an ultraviolet irradiation treatment. When a thermosetting resin is used, heat treatment may be performed. In addition, heat treatment may be performed to the ultraviolet curing resin. Light for light irradiation may be light emitted from a lamp or laser light. A method and conditions (energy, time, pressure, atmosphere, and the like) of an irradiation treatment may be set as appropriate in accordance with a material used for the sealant. Further, a method and conditions (temperature, time, pressure, atmosphere, and the like) of heat treatment may also be set as appropriate in accordance with a property of the sealant.

The projections physically destroy the cured region of the surface of the sealant. It is acceptable as long as the projections have strength and height with which the projections can reach the uncured region inside the sealant, and there is no particular limitation on a material and a shape used for the projections. The projections preferably have shapes with a function as a wedge so that the projections are easily implanted in the sealant and adhesion between the projections and the sealant is increased. A pyramid shape such as a pointed needle-like shape (e.g. a cone shape and a polygonal pyramid), a triangular pole of which side surface is provided so as to be in contact with the substrate, or the like can be used.

Figure 2A:
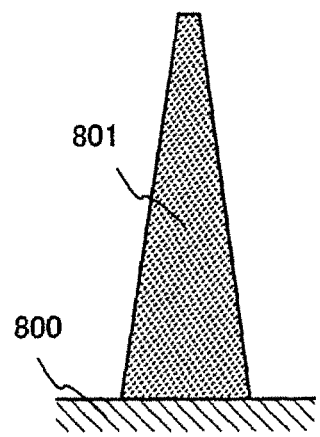
FIGS. 2A to 2D are views each illustrating an example of a projection which can be applied to the present invention.
Figure 2B:
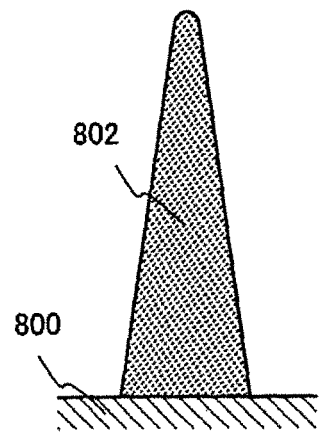
Figure 2C:
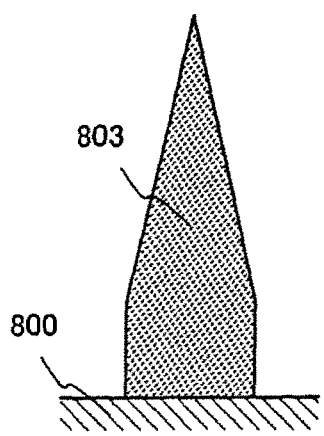
Figure 2D:
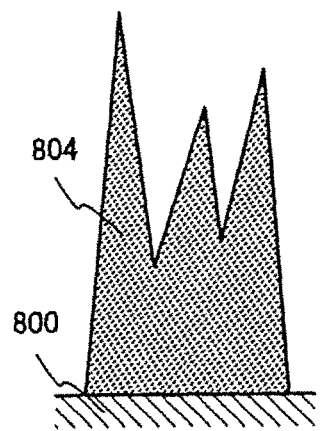

The projections may have a conical shape, a polygonal pyramid (such as a triangular pyramid, quadrangular pyramid, pentagonal pyramid, or six-sided pyramid) shape, a needle-like shape, a shape of a projection with its apex cut off by a plane parallel to its base, a dome shape with a rounded top, or the like. FIGS. 2A to 2D illustrate examples of the shapes of the projections. FIGS. 2A to 2D illustrate cross sections of a surface parallel to a width direction of the sealant, like the projections 58a and 58b illustrated in FIGS. 1D-1 and 1E-1. FIG. 2A illustrates a projection 801 provided over a substrate 800. The projection 801 has a shape having an upper base and a lower base, not a pointed shape like a pyramid shape. Therefore, a cross-section on a plane perpendicular to the lower base is trapezoidal. FIG. 2B illustrates an example in which a projection 802 having a rounded top is provided over the substrate 800. In this manner, the projection may have a shape with a rounded top and a curvature. FIG. 2C illustrates an example in which a projection 803 where a pyramid shape is stacked on a columnar shape is provided over the substrate 800. FIG. 2D illustrates a projection of which top is divided into a plurality of parts.

Figure 4A:
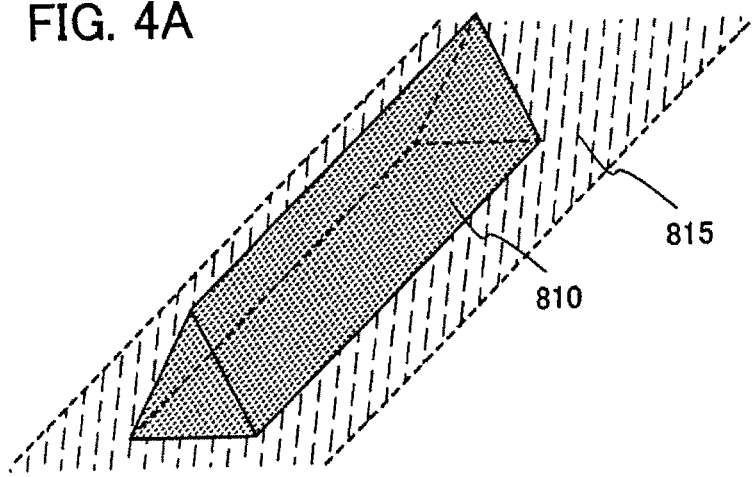
FIGS. 4A to 4C are views each illustrating an example of a projection which can be applied to the present invention.
Figure 4B:
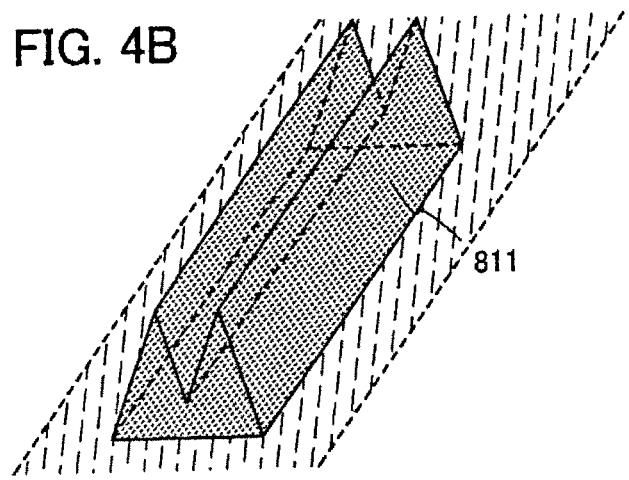
Figure 4C:
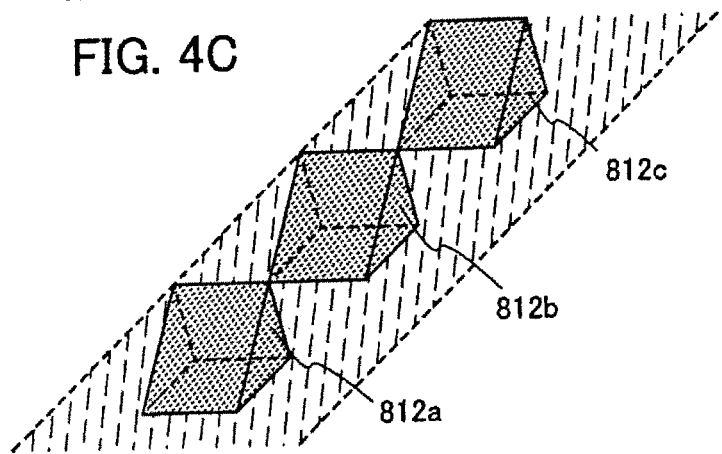

FIGS. 4A to 4C are perspective views each illustrating an example of a shape of the projection except a pyramid shape. Note that the sealant adhesive region is illustrated as a region 815 in FIGS. 4A to 4C. FIG. 4A illustrates a projection 810 with a triangular pole shape of which side surface is in contact with the substrate. FIG. 4B illustrates a projection illustrated in FIG. 4A of which top is divided into a plurality of parts and which has a groove. FIG. 4C illustrates projections 812a, 812b and 812c with triangular pole shapes which are provided in a different direction from that of the projection 810 illustrated in FIG. 4A with respect to the sealant. In this manner, the projections may be formed so that they can be implanted in the sealant and can have various shapes.

Figure 3A:
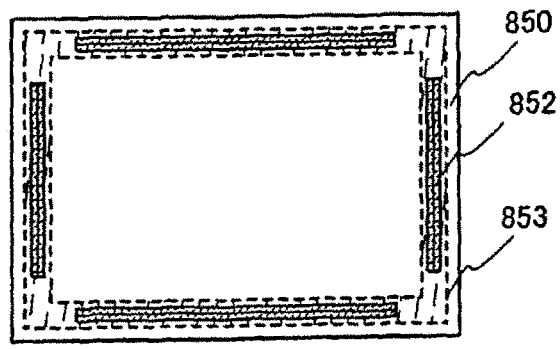
FIGS. 3A to 3D are views each illustrating an example of forming a projection which can be applied to the present invention.
Figure 3B:
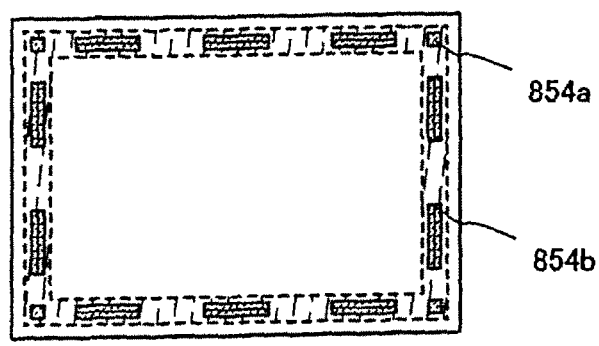
Figure 3C:
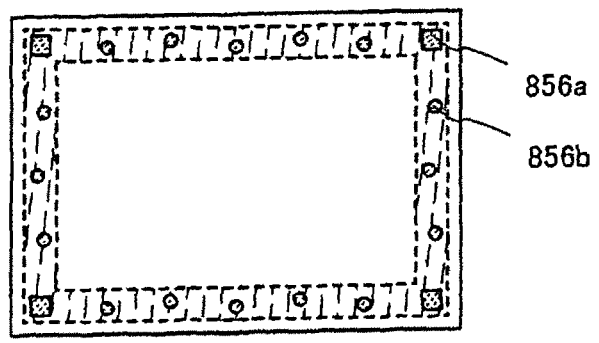
Figure 3D:
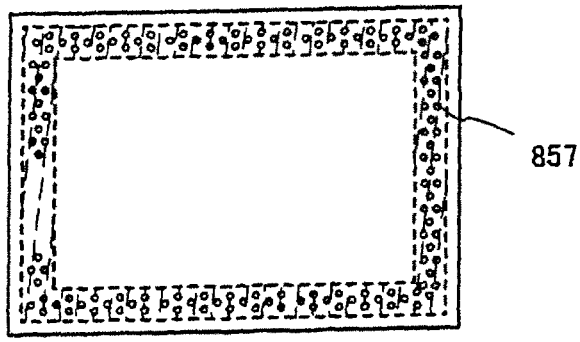

FIGS. 3A to 3D illustrate examples of other shapes and arrangement of a plurality of projections. In FIGS. 3A to 3D, the projections are provided in a sealant adhesive region 853 over a substrate 850. FIG. 3A illustrates a projection 852 with a triangular pole shape of which side surface is in contact with the substrate 850 as illustrated in FIG. 4A. In FIG. 3A, each projection is provided for each of four sides of the substrate. FIG. 3B illustrates an example in which a plurality of projections 854a and 854b having different shapes are provided. The projection 854a has a shape of a quadrangular pyramid and the projection 854b has a triangular pole shape and is provided so that a side surface of the projection 854b is in contact with the substrate 850 as illustrated in FIG. 4A. FIG. 3C illustrates an example in which a plurality of projections 856a and 856b having different shapes are provided. The plurality of projections 856a with a shape of a quadrangular pyramid and the projections 856b with a conical shape are provided. FIG. 3D illustrates an example in which a plurality of minute projections 857 with a needle-like shape are provided in the sealant adhesive region. Since the projections needs to be formed so as to avoid a region in which an external terminal for electrically connecting to the outside is formed, when the plurality of projections is formed in the entire sealant adhesive region as illustrated in FIG. 3D, the projections are formed with intervals so as to avoid the region in which an external terminal is formed. The projections may be formed as appropriate so that positions where the external terminal and the projections are formed are not overlapped each other depending on the position where the external terminal is formed or the shape of the projection.

The projections may be formed using the same material as a component of the liquid crystal display device and in the same manufacturing process as the liquid crystal display device. Further, only the projections may be formed in a different process.

Further, asperity may be formed so that the function of the projection as a wedge can be improved by processing a surface of the projection. When the projection has an anchor effect of functioning as a wedge, the first substrate and the second substrate can be attached more firmly. The asperity may be formed by addition of physical force or impact to the projection. The projection may be changed partially (being dissolved partially, or the like) by a chemical treatment (corrosion, or the like of a surface by a solution with a corrosion effect) or heating to form the asperity.

The plurality of projections may be formed by processing the substrate or may also be formed over the substrate by formation of a film, or the like. In addition, the projections may be formed in a different process and attached to the substrate with an adhesive agent, or the like. As a substrate over which the projections are provided, a glass substrate, a quartz substrate, or the like can be used. A flexible substrate may also be used. The flexible substrate indicates a substrate that can be bent. As the flexible substrate, a high-molecular material elastomer, which can be processed to be shaped similarly to plastic by plasticization at high temperature, and has a property such as an elastic body like rubber at room temperature, or the like can be given in addition to a plastic substrate made of polycarbonate, polyarylate, polyethersulfone, or the like. Alternatively, a film (made of polypropylene, polyester, vinyl, polyvinyl fluoride, vinyl chloride, or the like) or an inorganic vapor deposition film can be used. In this manner, the liquid crystal display device of the present invention can be formed employing various shapes having the plurality of projections.

A material for forming the projection may be an inorganic material or an organic material and may be an insulating material or a conductive material. For example, as a material for forming the projection, silicon, nitrogen, fluorine, oxide, nitride, fluoride, or the like can be used. As oxide, the following can be used: silicon oxide, boric oxide, sodium oxide, magnesium oxide, aluminum oxide (alumina), potassium oxide, calcium oxide, diarsenic trioxide (arsenious oxide), strontium oxide, antimony oxide, barium oxide, indium tin oxide (ITO), zinc oxide (ZnO), indium zinc oxide (IZO) in which zinc oxide (ZnO) is mixed in indium oxide, a conductive material in which silicon oxide is mixed in indium oxide, organic indium, organic tin, indium oxide containing tungsten oxide, indium zinc oxide containing tungsten oxide, indium oxide containing titanium oxide, indium tin oxide containing titanium oxide, or the like. As the nitride, aluminum nitride, silicon nitride, or the like can be used. As the fluoride, lithium fluoride, sodium fluoride, magnesium fluoride, calcium fluoride, lanthanum fluoride, or the like can be used. The material used for the projections may include one or more kinds of the above-described silicon, nitrogen, fluorine, oxide, nitride, and fluoride. The above-described materials used for the substrate can also be used.

As other materials used for the projection, a high molecule such as polyimide, aromatic polyamide, or polybenzimidazole; or a siloxane resin may be used. Alternatively, a resin material such as a vinyl resin like polyvinyl alcohol or polyvinylbutyral, an epoxy resin, a phenol resin, a novolac resin, an acrylic resin, a melamine resin, or a urethane resin, or the like may be used. In addition, metal such as Ag, Au, Cu, Ni, Pt, Pd, Ir, Rh, W, or Al, metal sulfide such as Cd or Zn, an oxide of Fe, Ti, Si, Ge, Zr, Ba, or the like, or a mixture of the materials may also be used.

The plurality of projections can be formed in a manner such that a thin film is formed by a sputtering method, a vacuum evaporation method, a PVD (physical vapor deposition) method, or a CVD (Chemical Vapor Deposition) method such as a low-pressure CVD (LPCVD) method or a plasma CVD method, and then etched into a desired shape. Alternatively, a droplet discharging method by which a pattern can be formed as selected, a printing method by which a pattern can be transferred or drawn (a method for forming a pattern such as screen printing or offset printing), a coating method, such as a spin coating method, a dipping method, a dispenser method, a brush coating method, a spraying method, a flow coating method, or the like can be employed. Still alternatively, an imprinting technique or a nanoimprinting technique with which a nanoscale three-dimensional structure can be formed by a transfer technology can be employed. Imprinting and nanoimprinting are techniques for forming a minute three-dimensional structure without using a photolithography process.

A spacer which controls a distance between the first substrate and the second substrate may be formed in a pixel region and a sealant formation region of the first substrate and the second substrate.

Figure 18:
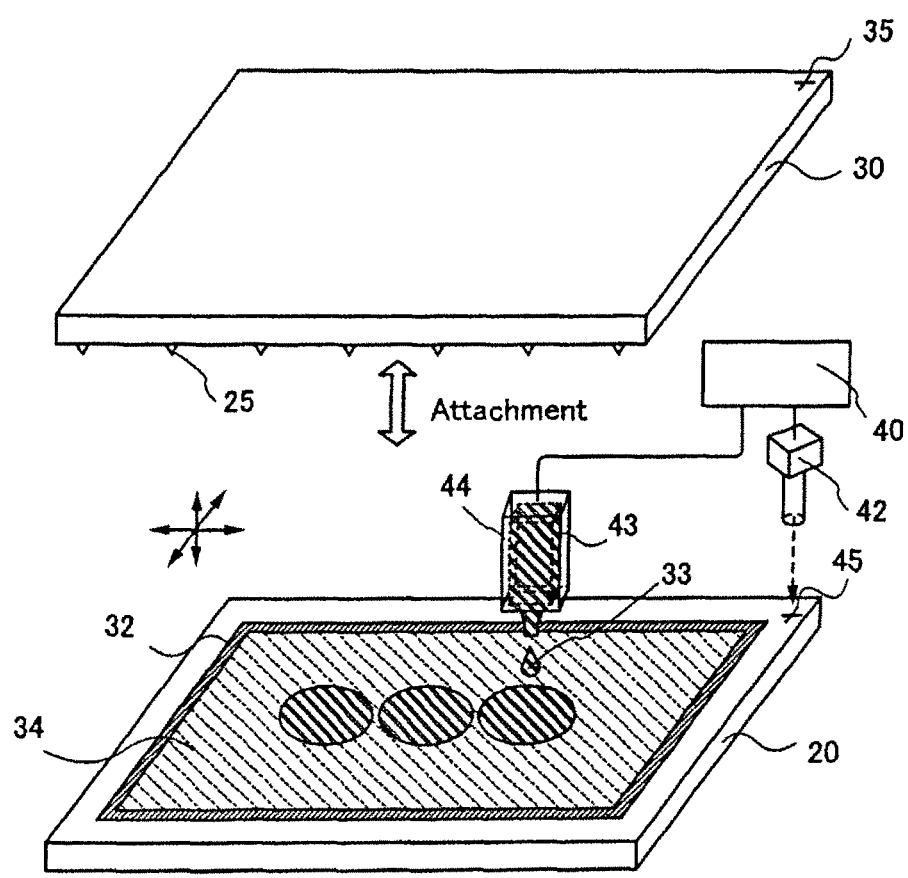
FIG. 18 is a view illustrating an example of a liquid crystal dropping method which can be applied to the present invention.

A liquid crystal dropping method employing a dispenser method, which can be used in the present invention, will be described with reference to FIG. 18. The liquid crystal dropping method illustrated in FIG. 18 includes a control device 40, an imaging unit 42, a head 43, a heater 44, liquid crystal 33, markers 35 and 45, an insulating layer 34 which is an alignment film, a sealant 32, the first substrate 20, and the second substrate 30. The plurality of projections 25 is formed in a sealant adhesive region of the second substrate 30. The sealant 32 has a cured region on a surface thereof and has an uncured region inside. The uncured sealant is formed in a frame-shaped seal pattern, and only the surface of the sealant is cured by the first cure treatment to form the sealant. The liquid crystal 33 is dropped in the seal pattern having a frame-shape from the head 43. When the viscosity of the liquid crystal 33 to be dropped is high, the liquid crystal 33 is heated by the heater 44 and the viscosity thereof is adjusted, whereby the liquid crystal 33 can be dropped. The first substrate 20 and the second substrate 30 are attached to each other so that the plurality of projections 25 is implanted in the sealant 32. The liquid crystal is filled with, and the sealant 32 is wholly cured to form a liquid crystal layer.

After the first substrate and the second substrate are attached to each other with the filled liquid crystal layer interposed therebetween, the sealant is cured and preferably subjected to heat treatment. By heat treatment, the sealant is further cured, so that the adhesive strength can be improved and orientation disorder of the liquid crystal can be corrected. A process of attaching is preferably conducted under a reduced pressure.

As the sealant, typically, a material containing a visible light curable resin, an ultraviolet curable resin, or a thermosetting resin can be used. For example, an epoxy resin such as a bisphenol-A liquid resin, a bisphenol-A solid resin, a bromine-containing epoxy resin, a bisphenol-F resin, a bisphenol-AD resin, a phenol resin, a cresol resin, a novolac resin, a cycloaliphatic epoxy resin, an Epi-Bis type epoxy resin, a glycidyl ester resin, a glycidyl amine resin, a heterocyclic epoxy resin, or a modified epoxy resin can be used. The uncured sealant can be formed using a droplet discharging method by which a pattern can be formed as selected, a printing method by which a pattern can be transferred or drawn (a method for forming a pattern, such as screen printing or offset printing), a dispenser method, or the like.

In FIGS. 1A-1 to 1E-2, as the first substrate 50 and the second substrate 57, a glass substrate, a quartz substrate, or the like can be used. A flexible substrate can also be used. The flexible substrate indicates a substrate that can be bent. As the flexible substrate, a high-molecular material elastomer, which can be processed to be shaped similarly to plastic by plasticization at high temperature, and has a property such as an elastic body like rubber at room temperature, or the like can be given in addition to a plastic substrate made of polycarbonate, polyarylate, polyethersulfone, or the like. Alternatively, a film (made of polypropylene, polyester, vinyl, polyvinyl fluoride, vinyl chloride, or the like) or an inorganic vapor deposition film can be used.

When an alignment film is used, the insulating layer serving as an alignment film can be formed using polyimide, polyamide, or the like. The insulating layer can serve as an alignment film by being subjected to rubbing treatment, but it is not limited as long as the insulating layer can serve as an alignment film which aligns liquid crystal molecules in one direction. Light irradiation or heat treatment may be performed on the insulating layer to form an alignment film.

Although not illustrated in FIGS. 1A-1 to 1E-2, the first substrate 50 and the second substrate 57 are provided with electrode layers to be a pixel electrode layer and a counter electrode layer. The electrode layer to be the pixel electrode layer or the counter electrode layer can be formed using one or more kinds of indium tin oxide (ITO), IZO (indium zinc oxide) which is obtained by mixing indium oxide with zinc oxide (ZnO), or a conductive material which is obtained by mixing indium oxide and silicon oxide ($SiO_2$); organic indium; organotin; indium oxide containing tungsten oxide; indium zinc oxide containing tungsten oxide; indium oxide containing titanium oxide; indium tin oxide containing titanium oxide; a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag); an alloy of the metal; or nitride of the metal.

The pixel electrode layer, the counter electrode layer, the insulating layer, or the like can be formed in a manner such that a thin film is formed by a sputtering method, a vacuum evaporation method, a PVD (physical vapor deposition) method, or a CVD (Chemical Vapor Deposition) method such as a low-pressure CVD (LPCVD) method or a plasma CVD method, and then etched into a desired shape. Alternatively, a droplet discharging method by which a pattern can be formed as selected, a printing method by which a pattern can be transferred or drawn (a method for forming a pattern such as screen printing or offset printing), a coating method, such as a spin coating method, a dipping method, a dispenser method, a brush coating method, a spraying method, a flow coating method, or the like can be employed. Still alternatively, an imprinting technique or a nanoimprinting technique with which a nanoscale three-dimensional structure can be formed by a transfer technology can be employed. Imprinting and nanoimprinting are techniques for forming a minute three-dimensional structure without using a photolithography process.

In the case of a transmissive liquid crystal display device, a light transmitting conductive material may be used for the pixel electrode layer and the counter electrode layer. On the other hand, in the case of a reflective liquid crystal display device, a reflective layer may be additionally provided. Alternatively, a reflective conductive material is used for the pixel electrode layer and a light transmitting conductive material is used for the counter electrode layer so that light reflected by the pixel electrode layer passes through the counter electrode layer and is emitted from the viewing side.

In the case of the transmissive liquid crystal display device, a backlight, a sidelight, or the like may be used as a light source. In the case of the reflective liquid crystal display device, a polarizing plate is provided over a substrate of the viewing side. In the case of the transmissive liquid crystal display device, a structure is employed in which polarizing plates are provided over a first substrate side and a second substrate side with a liquid crystal layer interposed therebetween. An optical film such as a retardation plate or an antireflection film, or the like may be provided in addition to the polarizing plate.

In this embodiment mode, an example is described in which the sealant is formed over the first substrate 50, the liquid crystal is dropped and the second substrate 57 is attached to the first substrate. When an element substrate provided with a semiconductor element such as a thin film transistor is used, the liquid crystal may be dropped to the element substrate. Alternatively, the sealant may be provided for a counter substrate provided with a color filter, a black matrix, or the like and the liquid crystal may be dropped to the counter substrate. Accordingly, the first substrate 50 may be the element substrate and the second substrate 57 may be the counter substrate, or the first substrate 50 may be the counter substrate and the second substrate 57 may be the element substrate. The liquid crystal may be dropped to the substrate over which the sealant is formed or the substrate over which the plurality of projections is formed. When the liquid crystal is dropped to the substrate over which the plurality of projections is formed, the viscosity or a dropping position of the liquid crystal may be set so that the liquid crystal does not spread outside the sealant adhesive region and does not leak outside the substrate.

Accordingly, in the liquid crystal display device of this embodiment mode using the present invention, deterioration of the liquid crystal which is caused in a manufacturing process can be prevented. Further, the liquid crystal display device with good adhesion between substrates, high reliability and high image quality can be realized. Moreover, such a liquid crystal display device which has high reliability and displays a high-quality image can be manufactured with high productivity.

Embodiment Mode 2

In this embodiment mode, an example of a liquid crystal display device in which deterioration of liquid crystal caused in a manufacturing process is prevented and which has higher reliability, higher image quality, and good adhesion between substrates, and the manufacturing method thereof will be described. Specifically, a case in which a structure of the liquid crystal display device is a passive matrix type will be described.

Figure 5A:
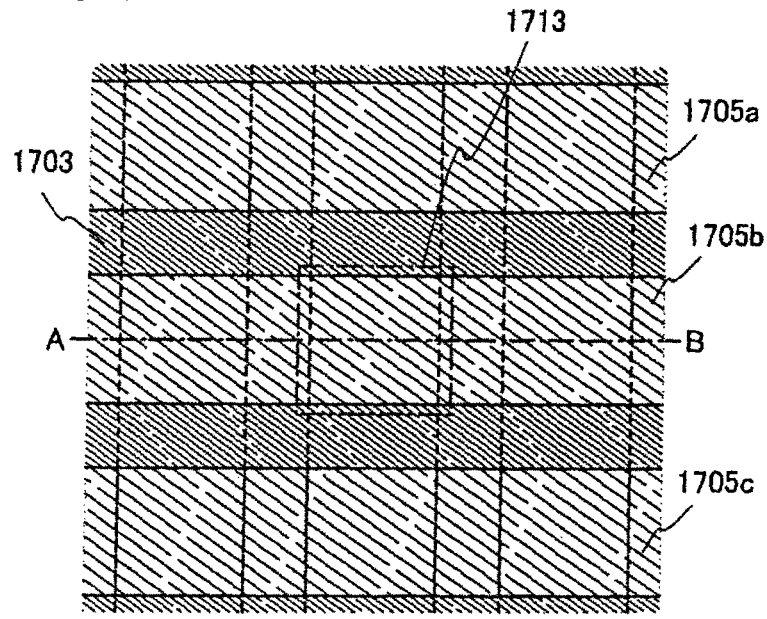
FIGS. 5A and 5B are a top view and a cross sectional view illustrating a liquid crystal display device of the present invention, respectively.
Figure 5B:
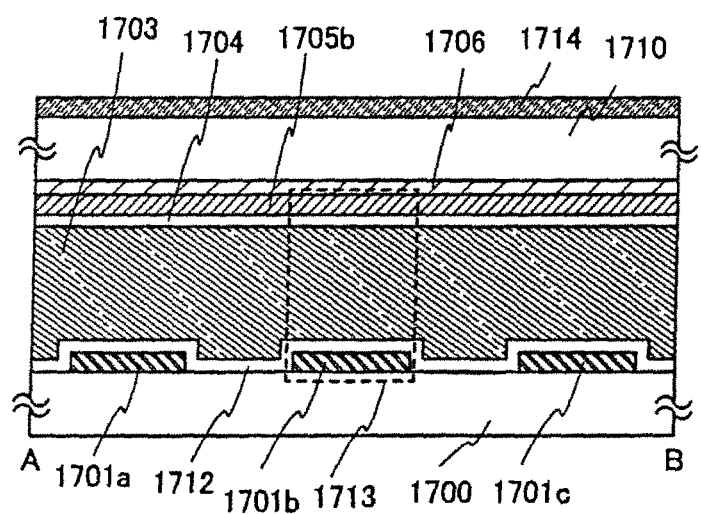

FIGS. 5A and 5B illustrate a passive matrix liquid crystal display device in this embodiment mode using the present invention. FIG. 5A is a top view of the liquid crystal display device, and FIG. 5B is a cross sectional view taken along a line A-B in FIG. 5A. In FIG. 5A, an insulating layer 1704 serving as an alignment film, a colored layer 1706, a counter substrate 1710, a polarizing plate 1714, and the like are omitted and are not illustrated; however, they are provided as illustrated in FIG. 5B.

In FIGS. 5A and 5B, a substrate 1700 provided with pixel electrode layers 1701a, 1701b and 1701c which extend in a first direction and an insulating layer 1712 serving as an alignment film faces a substrate 1710 provided with an insulating layer 1704 serving as an alignment film, counter electrode layers 1705a, 1705b and 1705c which extend in a second direction perpendicular to the first direction, a colored layer 1706 serving as a color filter and a polarizing plate 1714 with a liquid crystal layer 1703 interposed therebetween (see FIGS. 5A and 5B). The alignment film indicates an insulating layer in which molecules at its surface are made aligned by rubbing treatment or the like.

Similarly to Embodiment Mode 1, in this embodiment mode using the present invention, with respect to a method for manufacturing a liquid crystal display device in which liquid crystal is dropped by a dropping method to form the liquid crystal layer, a surface of an uncured sealant formed over a first substrate (the substrate 1700 or the substrate 1710) is cured by a first cure treatment before dropping the liquid crystal. After dropping the liquid crystal, the first substrate (the substrate 1700 or the substrate 1710) and the second substrate (the substrate 1700 or the substrate 1710) are attached to each other with the liquid crystal interposed therebetween. Then, the sealant is subjected to a second cure treatment to be cured wholly. In this embodiment mode, the second substrate (the substrate 1700 or the substrate 1710) has a plurality of projections in an sealant adhesive region. The first substrate (the substrate 1700 or the substrate 1710) and the second substrate (the substrate 1700 or the substrate 1710) are attached to each other with the liquid crystal interposed therebetween so that the plurality of projections is implanted in the sealant formed over the first substrate (the substrate 1700 or the substrate 1710).

Since the surface of the sealant is cured by the first cure treatment, the liquid crystal is not in contact with the uncured sealant. Accordingly, contamination of the liquid crystal due to the uncured sealant can be prevented. Therefore, reduction in reliability of the liquid crystal display device caused by deterioration of the liquid crystal can be prevented. The liquid crystal display device with reduced display unevenness, a reduced display defect and high image quality can be realized.

In this embodiment mode, although the surface of the sealant is cured by the first cure treatment, an inside of the sealant is still in an uncured state in which adhesiveness is high. Since a sealant adhesive region of the second substrate (the substrate 1700 or the substrate 1710) is provided with the plurality of projections, when the first substrate (the substrate 1700 or the substrate 1710) and the second substrate (the substrate 1700 or the substrate 1710) are attached to each other, the plurality of projections is implanted in the sealant. The projections physically destroy the surface of the sealant of which adhesiveness is lowered by cure treatment and penetrate the inside of the sealant, so that the projections can be in contact with the uncured sealant with high adhesiveness. Accordingly, the sealant in which the plurality of projections is implanted is wholly cured by the second cure treatment, whereby the first substrate (the substrate 1700 or the substrate 1710) and the second substrate (the substrate 1700 or the substrate 1710) can be attached firmly to each other and can stick to each other Adhesiveness between the first substrate (the substrate 1700 or the substrate 1710) and the second substrate (the substrate 1700 or the substrate 1710) can be improved and reliability of the liquid crystal display device can be improved.

In this embodiment mode, a cure treatment is performed at least twice or more; the first cure treatment is treatment in which only the surface of the sealant is cured and the second cure treatment is treatment in which the sealant is wholly cured in a state where the projections are implanted in the sealant. Each of the first cure treatment and the second cure treatment may be performed once or a plurality of times. The same treatment may be performed (for example, light irradiation treatment is performed twice) and different treatments may be performed (for example, the first is light irradiation treatment and the second is heat treatment) as the cure treatments.

As the cure treatment, light irradiation treatment using ultraviolet rays, or the like or heat treatment may be performed. When an ultraviolet curing resin is used as the sealant, the ultraviolet curing resin is cured by an ultraviolet irradiation treatment. When a thermosetting resin is used, heat treatment may be performed. In addition, heat treatment may be performed to the ultraviolet curing resin. Light for light irradiation may be light emitted from a lamp or laser light. A method and conditions (energy, time, pressure, atmosphere, and the like) of an irradiation treatment may be set as appropriate in accordance with a material used for the sealant. Further, a method and conditions (temperature, time, pressure, atmosphere, and the like) of heat treatment may also be set as appropriate in accordance with a property of the sealant.

The projections physically destroy the cured region of the surface of the sealant. It is acceptable as long as the projections have strength and height with which the projections can reach the uncured region inside the sealant, and there is no particular limitation on a material and a shape used for the projections. The projections preferably have a shape with a function as a wedge so that the projections are easily implanted in the sealant and adhesion between the projections and the sealant is increased. A pyramid shape such as a pointed needle-like shape (e.g. a cone shape and a polygonal pyramid), a triangular pole of which side surface is provided so as to be in contact with the substrate, or the like can be used.

The projections may be formed using the same material as a component of the liquid crystal display device and in the same manufacturing process as the liquid crystal display device. Further, only the projections may be formed in a different process.

Further, asperity may be formed so that the function of the projection as a wedge can be improved by processing the surface of the projection. When the projection has an anchor effect of functioning as a wedge, the first substrate and the second substrate can be attached firmly. The asperity may be formed by addition of physical force or impact to the projection. The projection may be changed partially (being dissolved partially, or the like) by a chemical treatment (corrosion, or the like of a surface by a solution with a corrosion effect) or heating to form the asperity.

The plurality of projections may be formed by processing the substrate or may also be formed over the substrate by formation of a film, or the like. Alternatively, the projections may be formed in a different process and attached to the substrate with an adhesive agent, or the like. As a substrate which is provided with the projections, a glass substrate or a quartz substrate can be used. A flexible substrate may also be used. The flexible substrate indicates a substrate that can be bent. As the flexible substrate, a high-molecular material elastomer, which can be processed to be shaped similarly to plastic by plasticization at high temperature, and has a property such as an elastic body like rubber at room temperature, or the like can be given in addition to a plastic substrate made of polycarbonate, polyarylate, polyethersulfone, or the like. Alternatively, a film (made of polypropylene, polyester, vinyl, polyvinyl fluoride, vinyl chloride, or the like) or an inorganic vapor deposition film can be used. In this manner, the liquid crystal display device of the present invention can be formed employing various shapes having the plurality of projections.

A material for forming the projection may be an inorganic material or an organic material and may be an insulating material or a conductive material. For example, as a material for forming the projection, silicon, nitrogen, fluorine, oxide, nitride, fluoride, or the like can be used. As oxide, the following can be used: silicon oxide, boric oxide, sodium oxide, magnesium oxide, aluminum oxide (alumina), potassium oxide, calcium oxide, diarsenic trioxide (arsenious oxide), strontium oxide, antimony oxide, barium oxide, indium tin oxide (ITO), zinc oxide (ZnO), indium zinc oxide (IZO) in which zinc oxide (ZnO) is mixed in indium oxide, a conductive material in which silicon oxide is mixed in indium oxide, organic indium, organic tin, indium oxide containing tungsten oxide, indium zinc oxide containing tungsten oxide, indium oxide containing titanium oxide, indium tin oxide containing titanium oxide, or the like. As the nitride, aluminum nitride, silicon nitride, or the like can be used. As the fluoride, lithium fluoride, sodium fluoride, magnesium fluoride, calcium fluoride, lanthanum fluoride, or the like can be used. The material used for the projections may include one or more kinds of the above-described silicon, nitrogen, fluorine, oxide, nitride, and fluoride. The above-described materials used for the substrate can also be used.

As other materials used for the projection, a high molecule such as polyimide, aromatic polyamide, or polybenzimidazole; or a siloxane resin may be used.

Alternatively, a resin material such as a vinyl resin like polyvinyl alcohol or polyvinylbutyral, an epoxy resin, a phenol resin, a novolac resin, an acrylic resin, a melamine resin, or a urethane resin, or the like may be used. In addition, metal such as Ag, Au, Cu, Ni, Pt, Pd, Ir, Rh, W, or Al, metal sulfide of Cd or Zn, an oxide of Fe, Ti, Si, Ge, Zr, Ba, or the like, or a mixture of the materials may also be used.

The plurality of projections can be formed in a manner such that a thin film is formed by a sputtering method, a vacuum evaporation method, a PVD (physical vapor deposition) method, or a CVD (Chemical Vapor Deposition) method such as a low-pressure CVD (LPCVD) method or a plasma CVD method, and then etched into a desired shape. Alternatively, a droplet discharging method by which a pattern can be formed as selected, a printing method by which a pattern can be transferred or drawn (a method for forming a pattern such as screen printing or offset printing), a coating method, such as a spin coating method, a dipping method, a dispenser method, a brush coating method, a spraying method, a flow coating method, or the like can be employed. Still alternatively, an imprinting technique or a nanoimprinting technique with which a nanoscale three-dimensional structure can be formed by a transfer technology can be employed. Imprinting and nanoimprinting are techniques for forming a minute three-dimensional structure without using a photolithography process.

A spacer which controls a distance between the first substrate and the second substrate may be formed in the sealant formation regions of the first substrate and the second substrate.

After the first substrate and the second substrate are attached to each other with the filled liquid crystal layer interposed therebetween, the sealant is preferably cured and subjected to heat treatment. By heat treatment, the sealant is further cured, so that the adhesive strength can be improved and orientation disorder of the liquid crystal can be corrected. A process of attaching is preferably conducted under a reduced pressure.

As the sealant, typically, a visible light curable resin, an ultraviolet curable resin, or a thermosetting resin can be used. For example, an epoxy resin such as a bisphenol-A liquid resin, a bisphenol-A solid resin, a bromine-containing epoxy resin, a bisphenol-F resin, a bisphenol-AD resin, a phenol resin, a cresol resin, a novolac resin, a cycloaliphatic epoxy resin, an Epi-Bis type epoxy resin, a glycidyl ester resin, a glycidyl amine resin, a heterocyclic epoxy resin, or a modified epoxy resin can be used. The uncured sealant can be formed using a droplet discharging method by which a pattern can be formed as selected, a printing method by which a pattern can be transferred or drawn (a method for forming a pattern, such as screen printing or offset printing), a dispenser method, or the like.

When an element substrate over which a semiconductor element such as a thin film transistor is formed is used, the liquid crystal may be dropped to the element substrate. Alternatively, the sealant may be provided for a counter substrate provided with a color filter, a black matrix, or the like and the liquid crystal may be dropped to the counter substrate. Accordingly, the sealant may be provided for either the element substrate 1700 or the counter substrate 1710 and the liquid crystal may be dropped to either the element substrate 1700 or the counter substrate 1710.

As the substrates 1700 and 1710, a glass substrate, a quartz substrate, or the like can be used. A flexible substrate can also be used. The flexible substrate indicates a substrate that can be bent. As the flexible substrate, a high-molecular material elastomer, which can be processed to be shaped similarly to plastic by plasticization at high temperature, and has a property such as an elastic body like rubber at room temperature, or the like can be given in addition to a plastic substrate made of polycarbonate, polyarylate, polyethersulfone, or the like. Alternatively, a film (made of polypropylene, polyester, vinyl, polyvinyl fluoride, vinyl chloride, or the like) or an inorganic vapor deposition film can be used.

The pixel electrode layers 1701a, 1701b and 1701c and the counter electrode layers 1705a, 1705b and 1705c can be formed using one or more kinds of a conductive material such as indium tin oxide (ITO), IZO (indium zinc oxide) which is obtained by mixing indium oxide with zinc oxide (ZnO), or a mixture of indium oxide and silicon oxide ($SiO_2$); organic indium; organotin; indium oxide containing tungsten oxide; indium zinc oxide containing tungsten oxide; indium oxide containing titanium oxide; indium tin oxide containing titanium oxide; a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag); an alloy of the metal; or nitride of the metal.

In the case of a transmissive liquid crystal display device, a light-transmitting conductive material may be used for the pixel electrode layers 1701a, 1701b and 1701c and the counter electrode layers 1705a, 1705b and 1705c. In the case of a reflective liquid crystal display device, a reflective layer may be additionally provided. Alternatively, a reflective conductive material is used for the pixel electrode layers 1701a, 1701b and 1701c, and a light-transmitting conductive material is used for the counter electrode layers 1705a, 1705b and 1705c so that light reflected by the pixel electrode layers 1701a, 1701b and 1701c passes through the counter electrode layers 1705a, 1705b and 1705c and is emitted from the viewing side.

In the case of the transmissive liquid crystal display device, a backlight, a sidelight, or the like may be used as a light source. In the case of the transmissive liquid crystal display device, a polarizing plate is also provided outside the substrate 1700.

After forming a conductive layer, an insulating layer, or the like by discharging a composition by a droplet discharge method, the surface thereof may be planarized by pressing with pressure to improve planarity. As a pressing method, unevenness may be reduced by moving a roller-shaped object over the surface, or the surface may be pressed with a flat plate-shaped object. A heating step may be performed at the time of pressing. Alternatively, surface unevenness may be eliminated with an air knife after softening or melting the surface with a solvent or the like. A CMP method may be alternatively used for polishing the surface. This step may be employed in planarizing the surface when unevenness is generated by a droplet discharge method.

Accordingly, in the liquid crystal display device of this embodiment mode using the present invention, deterioration of the liquid crystal which is caused in a manufacturing process can be prevented. Further, the liquid crystal display device which has good adhesion between substrates and high reliability and high image quality can be realized. Moreover, such a liquid crystal display device with high reliability and high image quality can be manufactured with high productivity.

This embodiment mode can be freely combined with Embodiment Mode 1.

Embodiment Mode 3

In this embodiment mode, an example of a liquid crystal display device in which deterioration of liquid crystal caused in a manufacturing process is prevented and which has higher reliability, higher image quality, and good adhesion between substrates, and the manufacturing method thereof will be described. In this embodiment mode, a liquid crystal display device having a different structure from that described in Embodiment Mode 2 will be described. Specifically, a case in which a structure of the liquid crystal display device is an active matrix type will be described.

Figure 6A:
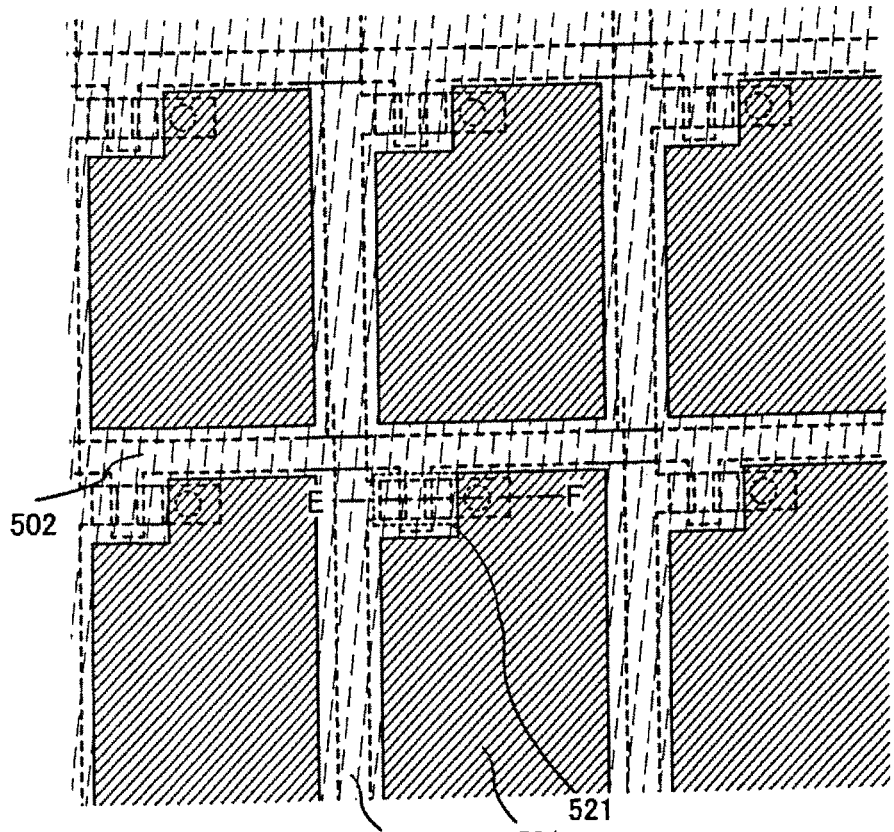
FIGS. 6A and 6B are a top view and a cross sectional view illustrating a liquid crystal display device of the present invention, respectively.
Figure 6B:
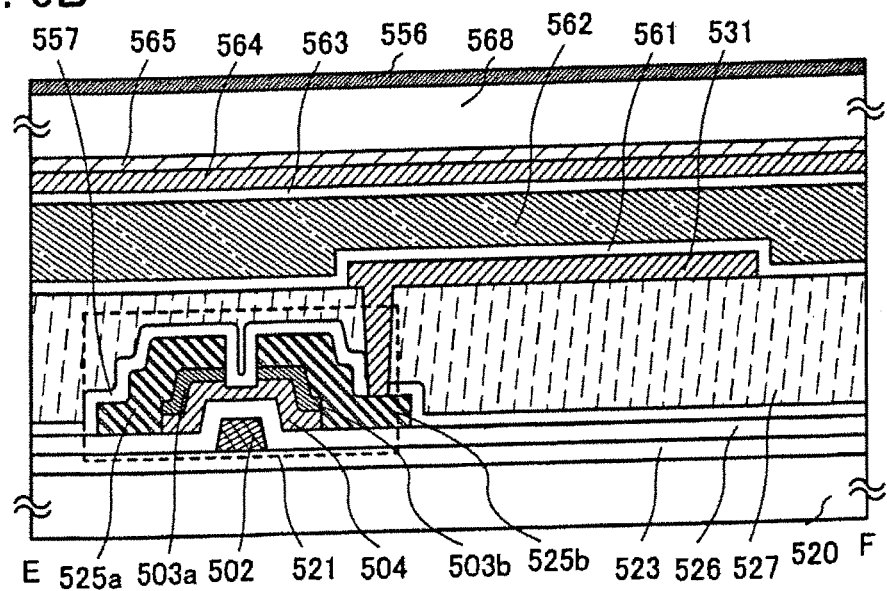

FIG. 6A is a top view of a liquid crystal display device, and FIG. 6B is a cross sectional view of a liquid crystal display device taken along a line E-F in FIG. 6A. In FIG. 6A, a liquid crystal layer, an alignment film which is provided for a counter substrate side, a counter electrode layer, a colored layer, and the like are omitted and are not illustrated; however, they are provided as illustrated in FIG. 6B.

First wirings that extend in a first direction and second wirings that extend in a second direction perpendicular to the first direction are provided in matrix over a substrate 520 provided with an insulating layer 523 as a base film. One of the first wirings is connected to a source electrode or a drain electrode of a transistor 521, and one of the second wirings is connected to a gate electrode of the transistor 521. A pixel electrode layer 531 is connected to a wiring layer 525b that is the source electrode or the drain electrode of the transistor 521, which is not connected to the first wiring.

The substrate 520 provided with the transistor 521 which is an inversely staggered thin film transistor, an insulating layer 557, an insulating layer 527, the pixel electrode layer 531 and an insulating layer 561 serving as an alignment film; and the substrate 568 provided with an insulating layer 563 serving as an alignment film, a counter electrode layer 564, a colored layer 565 serving as a color filter and a polarizing plate (a layer including a polarizer, or simply referred to as a polarizer) 556 face each other with a liquid crystal layer 562 interposed therebetween.

Similarly to Embodiment Mode 1, in this embodiment mode using the present invention, with respect to a method for manufacturing a liquid crystal display device in which liquid crystal is dropped by a dropping method to form the liquid crystal layer, a surface of an uncured sealant formed over a first substrate (the substrate 520 or the substrate 568) is cured by a first cure treatment before dropping the liquid crystal. After dropping the liquid crystal, the first substrate (the substrate 520 or the substrate 568) and the second substrate (the substrate 520 or the substrate 568) are attached to each other with the liquid crystal interposed therebetween. Then, the sealant is subjected to a second cure treatment to be cured wholly. In this embodiment mode, the second substrate (the substrate 520 or the substrate 568) has a plurality of projections in a sealant adhesive region. The first substrate (the substrate 520 or the substrate 568) and the second substrate (the substrate 520 or the substrate 568) are attached to each other with the liquid crystal interposed therebetween so that the plurality of projections is implanted in the sealant formed over the first substrate (the substrate 520 or the substrate 568).

Since the surface of the sealant is cured by the first cure treatment, the liquid crystal is not in contact with the uncured sealant. Accordingly, contamination of the liquid crystal due to the uncured sealant can be prevented. Therefore, reduction in reliability of the liquid crystal display device caused by deterioration of the liquid crystal can be prevented. The liquid crystal display device with reduced display unevenness, a reduced display defect and high image quality can be realized.

In this embodiment mode, although the surface of the sealant is cured by the first cure treatment, the inside of the sealant is still in an uncured state in which adhesiveness is high. Since a sealant adhesive region of the second substrate (the substrate 520 or the substrate 568) is provided with the plurality of projections, when the first substrate (the substrate 520 or the substrate 568) and the second substrate (the substrate 520 or the substrate 568) are attached to each other, the plurality of projections is implanted in the sealant. The projections physically destroy the surface of the sealant of which adhesiveness is lowered by cure treatment and penetrate the inside of the sealant, so that the projections can be in contact with the uncured sealant with high adhesiveness. Accordingly, the sealant in which the plurality of projections is implanted is wholly cured by the second cure treatment, whereby the first substrate (the substrate 520 or the substrate 568) and the second substrate (the substrate 520 or the substrate 568) can be attached firmly to each other and can stick to each other. Adhesiveness between the first substrate (the substrate 520 or the substrate 568) and the second substrate (the substrate 520 or the substrate 568) can be improved and reliability of the liquid crystal display device can be improved.

In this embodiment mode, cure treatment is performed at least twice or more; the first cure treatment is treatment in which only the surface of the sealant is cured and the second cure treatment is treatment in which the sealant is wholly cured in a state where the projections are implanted in the sealant. Each of the first cure treatment and the second cure treatment may be performed once or a plurality of times. The same treatment may be performed (for example, light irradiation treatment is performed twice) and different treatments may be performed (for example, the first is light irradiation treatment and the second is heat treatment) as the cure treatments.

As the cure treatment, light irradiation treatment using ultraviolet rays, or the like or heat treatment may be performed. When an ultraviolet curing resin is used as the sealant, the ultraviolet curing resin is cured by an ultraviolet irradiation treatment. When a thermosetting resin is used, heat treatment may be performed. In addition, heat treatment may be performed to the ultraviolet curing resin. Light for light irradiation may be light emitted from a lamp or laser light. A method and conditions (energy, time, pressure, atmosphere, and the like) of an irradiation treatment may be set as appropriate in accordance with a material used for the sealant. Further, a method and conditions (temperature, time, pressure, atmosphere, and the like) of heat treatment may also be set as appropriate in accordance with a property of the sealant.

The projections physically destroy the cured region of the surface of the sealant. It is acceptable as long as the projections have strength and height with which the projections can reach the uncured region inside the sealant, and there is no particular limitation on a material and a shape used for the projections. The projections preferably have a shape with a function as a wedge so that the projections are easily implanted in the sealant and adhesion between the projections and the sealant is increased. A pyramid shape such as a pointed needle-like shape (e.g. a cone shape and a polygonal pyramid), a triangular pole of which side surface is provided so as to be in contact with the substrate, or the like can be used.

The projections may be formed using the same material as a component of the liquid crystal display device and in the same manufacturing process as the liquid crystal display device. Further, only the projections may be formed in a different process.

Further, asperity may be formed so that the function of the projection as a wedge can be improved by processing the surface of the projection. When the projection has an anchor effect of functioning as a wedge, the first substrate and the second substrate can be attached more firmly. The asperity may be formed by addition of physical force or impact to the projection. The projection may be changed partially (being dissolved partially, or the like) by a chemical treatment (corrosion, or the like of a surface by a solution with a corrosion effect) or heating to form the asperity.

The plurality of projections may be formed by processing the substrate or may also be formed over the substrate by formation of a film, or the like. Alternatively, the projections may be formed in a different process and attached to the substrate with an adhesive agent, or the like. As a substrate which is provided with the projections, a glass substrate or a quartz substrate can be used. A flexible substrate may also be used. The flexible substrate indicates a substrate that can be bent. As the flexible substrate, a high-molecular material elastomer, which can be processed to be shaped similarly to plastic by plasticization at high temperature, and has a property such as an elastic body like rubber at room temperature, or the like can be given in addition to a plastic substrate made of polycarbonate, polyarylate, polyethersulfone, or the like. Alternatively, a film (made of polypropylene, polyester, vinyl, polyvinyl fluoride, vinyl chloride, or the like) or an inorganic vapor deposition film can be used. In this manner, the liquid crystal display device of the present invention can be formed employing various shapes having the plurality of projections.

A material for forming the projection may be an inorganic material or an organic material and may be an insulating material or a conductive material. For example, as a material for forming the projection, silicon, nitrogen, fluorine, oxide, nitride, fluoride, or the like can be used. As oxide, the following can be used: silicon oxide, boric oxide, sodium oxide, magnesium oxide, aluminum oxide (alumina), potassium oxide, calcium oxide, diarsenic trioxide (arsenious oxide), strontium oxide, antimony oxide, barium oxide, indium tin oxide (ITO), zinc oxide (ZnO), indium zinc oxide (IZO) in which zinc oxide (ZnO) is mixed in indium oxide, a conductive material in which silicon oxide is mixed in indium oxide, organic indium, organic tin, indium oxide containing tungsten oxide, indium zinc oxide containing tungsten oxide, indium oxide containing titanium oxide, indium tin oxide containing titanium oxide, or the like. As the nitride, aluminum nitride, silicon nitride, or the like can be used. As the fluoride, lithium fluoride, sodium fluoride, magnesium fluoride, calcium fluoride, lanthanum fluoride, or the like can be used. The material used for the projections may include one or more kinds of the above-described silicon, nitrogen, fluorine, oxide, nitride, and fluoride. The above-described materials used for the substrate can also be used.

As other materials used for the projection, a high molecule such as polyimide, aromatic polyamide, or polybenzimidazole; or a siloxane resin may be used. Alternatively, a resin material such as a vinyl resin like polyvinyl alcohol or polyvinylbutyral, an epoxy resin, a phenol resin, a novolac resin, an acrylic resin, a melamine resin, or a urethane resin, or the like may be used. In addition, metal such as Ag, Au, Cu, Ni, Pt, Pd, Ti, Rh, W, or Al, metal sulfide of Cd or Zn, an oxide of Fe, Ti, Si, Ge, Zr, Ba, or the like, or a mixture of the materials may also be used.

The plurality of projections can be formed in a manner such that a thin film is formed by a sputtering method, a vacuum evaporation method, a PVD (physical vapor deposition) method, or a CVD (Chemical Vapor Deposition) method such as a low-pressure CVD (LPCVD) method or a plasma CVD method, and then etched into a desired shape. Alternatively, a droplet discharging method by which a pattern can be formed as selected, a printing method by which a pattern can be transferred or drawn (a method for forming a pattern such as screen printing or offset printing), a coating method, such as a spin coating method, a dipping method, a dispenser method, a brush coating method, a spraying method, a flow coating method, or the like can be employed. Still alternatively, an imprinting technique or a nanoimprinting technique with which a nanoscale three-dimensional structure can be formed by a transfer technology can be employed. Imprinting and nanoimprinting are techniques for forming a minute three-dimensional structure without using a photolithography process.

A spacer which controls a distance between the first substrate (the substrate 520 or the substrate 568) and the second substrate (the substrate 520 or the substrate 568) may be formed in the sealant formation regions of the first substrate (the substrate 520 or the substrate 568) and the second substrate (the substrate 520 or the substrate 568).

After the first substrate (the substrate 520 or the substrate 568) and the second substrate (the substrate 520 or the substrate 568) are attached to each other with the filled liquid crystal layer 562 interposed therebetween, the sealant is preferably cured and subjected to heat treatment. By heat treatment, the sealant is further cured, so that the adhesive strength can be improved and orientation disorder of the liquid crystal can be corrected. A process of attaching is preferably conducted under a reduced pressure.

As the sealant, typically, a visible light curable resin, an ultraviolet curable resin, or a thermosetting resin can be used. For example, an epoxy resin such as a bisphenol-A liquid resin, a bisphenol-A solid resin, a bromine-containing epoxy resin, a bisphenol-F resin, a bisphenol-AD resin, a phenol resin, a cresol resin, a novolac resin, a cycloaliphatic epoxy resin, an Epi-Bis type epoxy resin, a glycidyl ester resin, a glycidyl amine resin, a heterocyclic epoxy resin, or a modified epoxy resin can be used. The uncured sealant can be formed using a droplet discharging method by which a pattern can be formed as selected, a printing method by which a pattern can be transferred or drawn (a method for forming a pattern, such as screen printing or offset printing), a dispenser method, or the like.

When an element substrate over which a semiconductor element such as a thin film transistor is formed is used, the liquid crystal may be dropped to the element substrate. Alternatively, the sealant may be provided for a counter substrate provided with a color filter, a black matrix, or the like and the liquid crystal may be dropped to the counter substrate.

Accordingly, the sealant may be provided for either the element substrate 520 or the counter substrate 568 and the liquid crystal may be dropped to either the element substrate 520 or the counter substrate 568.

FIGS. 6A and 6B in this embodiment mode illustrate an example in which the transistor 521 is a channel-etch inversed-staggered transistor. In FIGS. 6A and 6B, the transistor 521 includes a gate electrode layer 502, a gate insulating layer 526, a semiconductor layer 504, semiconductor layers 503a and 503b having one conductivity type, wiring layers 525a and 525b, one of which serves as a source electrode layer and the other as a drain electrode layer.

Figure 7:
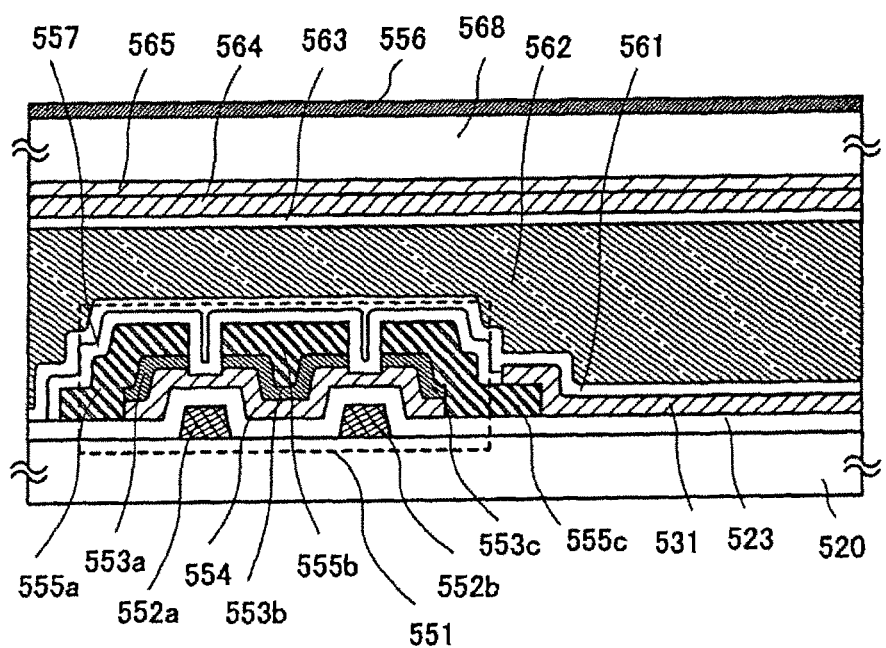
FIG. 7 is a cross sectional view illustrating a liquid crystal display device of the present invention.

FIG. 7 illustrates an example in which a transistor having a multi-gate structure is used. In FIG. 7, the substrate 520 provided with the transistor 551 having a multi-gate structure, the pixel electrode layer 531 and an insulating layer 561 serving as an alignment film; and the substrate 568 provided with an insulating layer 563 serving as an alignment film, a counter electrode layer 564, a colored layer 565 serving as a color filter and a polarizing plate (a layer including a polarizer, or simply referred to as a polarizer) 556 face each other with a liquid crystal layer 562 interposed therebetween.

In FIG. 7, the polarizing plate 556 is provided outside the substrate 568 which is a counter substrate. The polarizing plate, the color filter, and the like may be provided between the substrates or outside the substrates. In FIG. 7, an example of a liquid crystal display device in which the polarizing plate 556 is provided outside the substrate 568 and the colored layer 565 and the counter electrode layer 564 are sequentially provided inside the substrate 568 is illustrated; however, a stacked layer structure of the polarizing plate and the colored layer is not limited to that illustrated in FIG. 7 and may be set as appropriate depending on materials of the polarizing plate and the colored layer or conditions of a manufacturing process. FIG. 7 illustrates a reflective liquid crystal display device, and one polarizing plate is provided at the counter substrate side which is a viewing side. In the case of a transmissive liquid crystal display device, both of the element substrate and the counter substrate are provided with polarizing plates with the liquid crystal layer interposed therebetween. A retardation plate, or the like may also be provided between the polarizing plate and the alignment film and a surface which is the closest to the viewing side can be provided with an optical film such as an anti-reflection film.

The transistor 551 is an example of a multi-gate channel-etch inversed-staggered transistor. In FIG. 7, the transistor 551 includes gate electrode layers 552a and 552b; a gate insulating layer 523; a semiconductor layer 554; semiconductor layers 553a, 553b and 553c each having one conductivity type; wiring layers 555a, 555b and 555c each of which is a source electrode layer or a drain electrode layer. An insulating layer 557 is provided over the transistor 551.

As a material for forming the semiconductor layer, a polycrystalline semiconductor formed by crystallizing an amorphous semiconductor (hereinafter also referred to as an "AS") by utilizing light energy or thermal energy, a single crystalline semiconductor, or the like can be used. The amorphous semiconductor can be manufactured by a vapor phase growth method that uses a semiconductor material gas typified by silane or germane or a sputtering method.

Typical examples of an amorphous semiconductor include hydrogenated amorphous silicon, and typical examples of a crystalline semiconductor include polysilicon and the like. Examples of polysilicon (polycrystalline silicon) include so-called high-temperature polysilicon that contains polysilicon as a main component and is formed at a process temperature greater than or equal to 800° C., so-called low-temperature polysilicon that contains polysilicon as a main component and is formed at a process temperature less than or equal to 600° C., polysilicon obtained by crystallizing amorphous silicon by using an element that promotes crystallization or the like, and the like. Instead of such a thin film process, an SOI substrate formed by providing a single crystalline semiconductor layer on an insulating surface may be used. The SOI substrate can be formed by an SIMOX (separation by implanted oxygen) method or a Smart-Cut method. In the SIMOX method, oxygen ions are implanted into a single crystalline silicon substrate to form an oxygen-containing layer at a predetermined depth, and then heat treatment is conducted to form an embedded insulating layer at the predetermined depth from the surface, thereby forming a single crystalline silicon layer over the embedded insulating layer. In the Smart-Cut method, hydrogen ions are implanted into an oxidized single crystalline silicon substrate to form a hydrogen-containing layer in a portion corresponding to a desired depth, the oxidized single crystalline silicon substrate is attached to a supporting substrate (such as a single crystalline silicon substrate having a silicon oxide film for attachment on its surface), and heat treatment is conducted. Accordingly, the single crystalline silicon substrate is separated at the hydrogen-containing layer, and stack layers of the silicon oxide film and the single crystalline silicon layer is formed over the supporting substrate.

When a crystalline semiconductor film is used for the semiconductor film, the crystalline semiconductor layer may be formed by various methods such as a laser crystallization method, a thermal crystallization method, a thermal crystallization method using an element that promotes crystallization such as nickel, or the like. A microcrystalline semiconductor can be crystallized by laser irradiation, whereby crystallinity thereof can be enhanced. When the element that promotes crystallization is not added, before an amorphous semiconductor layer is irradiated with a laser beam, hydrogen contained in the amorphous semiconductor layer is discharged until the concentration of hydrogen becomes less than or equal to $1 \times 10^{20}$ atoms/cm$^3$ by heating the amorphous semiconductor layer at a temperature of 500° C. for one hour in a nitrogen atmosphere. This is because the amorphous semiconductor layer containing much hydrogen is damaged when irradiated with a laser beam. The thermal treatment for crystallization can be performed using a heating furnace, laser irradiation, irradiation with light emitted from a lamp (also referred to as lamp annealing), or the like. Examples of a heating method include an RTA method such as a GRTA (gas rapid thermal annealing) method or an LRTA (lamp rapid thermal annealing) method. GRTA is a method of thermal treatment using a high-temperature gas, and LRTA is a method of thermal treatment using light from a lamp.

The crystallization may be performed by adding an element that promotes crystallization (also referred to as a catalyst element or a metal element) to an amorphous semiconductor layer and applying thermal treatment (at 550 to 750° C. for 3 minutes to 24 hours) thereto in a crystallization step in which an amorphous semiconductor layer is crystallized to form a crystalline semiconductor layer. Examples of the element that promotes crystallization include one or more of iron (Fe), nickel (Ni), cobalt (Co), ruthenium (Ru), rhodium (Rh), palladium (Pd), osmium (Os), iridium (Ir), platinum (Pt), copper (Cu), and gold (Au).

Any method can be used to add a metal element into the amorphous semiconductor film as long as the method is capable of making the metal element exist on the surface or at the inside of the amorphous semiconductor film. For example, a sputtering method, a CVD method, a plasma treatment (including a plasma CVD method), an adsorption method, or a method of applying a metal salt solution can be employed. Among them, the method using a solution is simple and easy, and advantageous in easy adjustment of the concentration of the metal element. It is preferable to form an oxide film on the surface of the amorphous semiconductor film by UV irradiation in an oxygen atmosphere, a thermal oxidation method, treatment with ozone water or hydrogen peroxide including a hydroxyl radical, or the like so that the wettability of the surface of the amorphous semiconductor film is improved and an aqueous solution is easily spread over the entire surface of the amorphous semiconductor film.

In order to remove or reduce the element that promotes crystallization from the crystalline semiconductor layer, a semiconductor layer containing an impurity element is formed so as to be in contact with the crystalline semiconductor layer. Such a semiconductor layer containing an impurity element functions as a gettering sink. As the impurity element, an impurity element imparting n-type conductivity, an impurity element imparting p-type conductivity, a rare gas element, or the like can be used. For example, one or more of phosphorus (P), nitrogen (N), arsenic (As), antimony (Sb), bismuth (Bi), boron (B), helium (He), neon (Ne), argon (Ar), krypton (Kr), and xenon (Xe) can be used. A semiconductor layer containing a rare gas element is formed over the crystalline semiconductor layer containing the element that promotes crystallization, and thermal treatment (at 550 to 750° C. for 3 minutes to 24 hours) is performed. The element that promotes crystallization in the crystalline semiconductor layer moves into the semiconductor layer containing a rare gas element; thus, the element that promotes crystallization in the crystalline semiconductor layer is removed or reduced. After that, the semiconductor layer containing a rare gas element, which serves as a gettering sink, is removed.

Laser irradiation can be performed by relatively moving a laser beam and the semiconductor film. For laser irradiation, a marker can be formed in order to overlap a beam with the semiconductor film with high accuracy or control the start position or the end position of laser irradiation. Such a marker may be formed over the substrate at the same time as the formation of the amorphous semiconductor film.

In the case of using laser irradiation, a continuous-wave laser beam (a CW laser beam) or a pulsed laser beam can be used. Laser beams that can be used here are beams emitted from one or more kinds of the following lasers: a gas laser such as an Ar laser, a Kr laser, or an excimer laser; a laser using, as a medium, single-crystalline YAG, $YVO_4$, forsterite ($Mg_2SiO_4$), $YAlO_3$, or $GdVO_4$, or polycrystalline (ceramic) YAG, $Y_2O_3$, $YVO_4$, $YAlO_3$, or $GdVO_4$, to which one or more of Nd, Yb, Cr, Ti, Ho, Er, Tm, and Ta is added as a dopant; a glass laser; a ruby laser; an alexandrite laser; a Ti:sapphire laser; a copper vapor laser; and a gold vapor laser. Crystals having a large grain diameter can be obtained by irradiation with the fundamental wave of the above laser beam or the second harmonic to the fourth harmonic of the fundamental wave thereof. For example, the second harmonic (532 nm) or the third harmonic (355 nm) of a Nd:$YVO_4$ laser (the fundamental wave: 1064 nm) can be used. This laser can emit either a CW laser beam or a pulsed laser beam. In the case where a CW laser beam is emitted, the power density of the laser needs to be about 0.01 to 100 $MW/cm^2$ (preferably, 0.1 to 10 $MW/cm^2$). The scanning rate is set to about 10 to 2000 cm/sec for irradiation.

Note that the laser using, as a medium, single-crystalline YAG, $YVO_4$, forsterite ($Mg_2SiO_4$), $YAlO_3$, or $GdVO_4$, or polycrystalline (ceramic) YAG, $Y_2O_3$, $YVO_4$, $YAlO_3$, or $GdVO_4$, to which one or more of Nd, Yb, Cr, Ti, Ho, Er, Tm, and Ta is added as a dopant; an Ar ion laser; or a Ti:sapphire laser can perform continuous oscillation. In addition, it can also perform pulsed oscillation at a repetition rate of greater than or equal to 10 MHz by performing Q-switching operation, mode locking, or the like. When a laser beam is oscillated at a repetition rate of greater than or equal to 10 MHz, it is possible for a semiconductor film to be irradiated with the next pulse after it is melted by the laser beam and before it becomes solidified. Therefore, unlike the case of using a pulsed laser with a low repetition rate, a solid-liquid interface of the semiconductor film can be moved continuously. Thus, crystal grains that have grown continuously in the scanning direction can be obtained.

When ceramic (polycrystal) is used as a medium, the medium can be formed into a desired shape in a short time at low cost. In the case of using single crystals, a columnar medium having a diameter of several millimeters and a length of several tens of millimeters is generally used. However, in the case of using ceramic, a medium larger than that can be formed.

The concentration of the dopant such as Nd or Yb in the medium, which directly contributes to light emission, cannot be changed to a large degree either in single crystals or polycrystals. Therefore, there is a limitation on improvement of the laser output by increasing the concentration of the dopant. However, in the case of using ceramic, a laser output can be drastically increased because the size of the medium can be significantly increased compared with the case of using single crystals.

Further, in the case of using ceramic, a medium with a parallelepiped shape or a rectangular parallelepiped shape can be formed easily. When a medium with such a shape is used and oscillated light is made to travel inside the medium in a zigzag manner, a long oscillation path can be obtained. Therefore, large amplification can be achieved and high output can be obtained. In addition, since a laser beam emitted from the medium with such a shape has a quadrangular cross section at the time of emission, it can easily be shaped into a linear beam compared with the case of using a circular beam, which is advantageous. When the laser beam emitted in this manner is shaped with an optic system, a linear beam with a short side of less than or equal to one millimeter and a long side of several millimeters to several meters can be easily obtained. In addition, when the medium is uniformly irradiated with excitation light, a linear beam with a uniform energy distribution in the long-side direction can be obtained. Moreover, the semiconductor film is preferably irradiated with the laser beam at an incident angle $\theta$ ($0<\theta<90°$) in order to prevent laser interference.

When the semiconductor film is irradiated with the linear beam, the entire surface of the semiconductor film can be annealed more uniformly. In the case where uniform annealing is required from one end to the other end of the linear laser beam, it is necessary to exercise ingenuity, for example, by providing slits or the like at both ends so as to shield light at a portion where energy is attenuated.

When the thus obtained linear beam with uniform intensity is used to anneal the semiconductor film and this semiconductor film is used to manufacture a liquid crystal display device, the liquid crystal display device has favorable and uniform characteristics.

The laser beam irradiation may be performed in an inert gas atmosphere such as a rare gas or nitrogen. Accordingly, roughness of the semiconductor surface due to laser beam irradiation can be suppressed, and variation in threshold voltage caused by variation in the interface state density can be suppressed.

The amorphous semiconductor film may be crystallized by a combination of thermal treatment and laser light irradiation, or either thermal treatment or laser irradiation may be performed a plurality of times.

The gate electrode layer can be formed by a sputtering method, an evaporation method, a CVD method, or the like. The gate electrode layer may be formed using an element selected from tantalum (Ta), tungsten (W), titanium (Ti), molybdenum (Mo), aluminum (Al), copper (Cu), chromium (Cr), and neodymium (Nd), or an alloy material or compound material containing the element as its main component. Alternatively, the gate electrode layer may be formed using a semiconductor film typified by a polycrystalline silicon film doped with an impurity element such as phosphorus, or an AgPdCu alloy. The gate electrode layer may be a single layer or stacked layers.

In this embodiment mode, the gate electrode layer is formed to have a tapered shape; however, the present invention is not limited thereto. The gate electrode layer has a stacked-layer structure, and such a structure may be employed that one layer has a tapered shape and the other layer has a perpendicular side surface formed by anisotropic etching. The gate electrode layers to be stacked may have different taper angles or the same taper angle. If the gate electrode layer has a tapered shape, the coverage thereof with a film to be stacked thereover is improved and defects can be reduced to improve reliability.

The source electrode layer or the drain electrode layer can be formed by forming a conductive film by a sputtering method, a PVD method, a CVD method, an evaporation method, or the like and then etching the conductive film into a desired shape. Alternatively, the conductive layer can be formed as selected in a desired position by a droplet discharge method, a printing method, a dispenser method, an electroplating method, or the like. Still alternatively, a reflow method or a damascene method may be used. The source electrode layer or the drain electrode layer can be formed using a conductive material such as a metal, concretely, a material such as Ag, Au, Cu, Ni, Pt, Pd, Ir, Rh, W, Al, Ta, Mo, Cd, Zn, Fe, Ti, Zr, Ba, Si, or Ge, or an alloy or nitride thereof. Further, a stacked structure thereof may be employed.

The insulating layers 523 and 557 may be formed using an inorganic insulating material such as silicon oxide, silicon nitride, silicon oxynitride, aluminum oxide, aluminum nitride, or aluminum oxynitride; an acrylic acid, a methacrylic acid, or a derivative thereof; a heat resistant high molecular compound such as polyimide, aromatic polyamide, or polybenzimidazole; or a siloxane resin. Alternatively, a resin material such as a vinyl resin like polyvinyl alcohol or polyvinylbutyral, an epoxy resin, a phenol resin, a novolac resin, an acrylic resin, a melamine resin, or a urethane resin may be used. Further, an organic material such as benzocyclobutene, fluorinated arylene ether, or polyimide, a composition material containing a water-soluble homopolymer and a water-soluble copolymer, or the like may be used. The insulating layers 523, 557 and 527 can be formed by a vapor-phase growth method such as a plasma CVD method or a thermal CVD method, or a sputtering method. Alternatively, they can be formed by a droplet discharge method or a printing method (such as screen printing or offset printing by which a pattern is formed). A film obtained by a coating method, an SOG film, or the like can also be used.

Without limitation to this embodiment mode, the thin film transistor may have a single-gate structure in which a single channel formation region is formed, a double-gate structure in which two channel formation regions are formed, or a triple-gate structure in which three channel formation regions are formed. In addition, a thin film transistor in a peripheral driver circuit region may also have a single-gate structure, a double-gate structure, or a triple-gate structure.

Note that without limitation to the manufacturing method of a thin film transistor described in this embodiment mode, the present invention can be used in a top-gate structure (such as a staggered structure or a coplanar structure), a bottom-gate structure (such as an inverted coplanar structure), a dual-gate structure including two gate electrode layers provided above and below a channel region each with a gate insulating film interposed therebetween, or other structures.

The transistor may have any structure, as long as the transistor can serve as a switching element. The semiconductor layer may be formed using various semiconductors such as an amorphous semiconductor, a crystalline semiconductor, a polycrystalline semiconductor, and a microcrystalline semiconductor, or an organic transistor may be formed using an organic compound.

Accordingly, in the liquid crystal display device of this embodiment mode using the present invention, deterioration of the liquid crystal which is caused in the manufacturing process can be prevented and the liquid crystal display device can have good adhesion between substrates, high reliability and high image quality. Further, such a liquid crystal display device with high reliability and high image quality can be manufactured with high productivity.

This embodiment mode can be freely combined with Embodiment Mode 1.

Embodiment Mode 4

In this embodiment mode, an example of a liquid crystal display device in which deterioration of liquid crystal caused in a manufacturing process is prevented and which has good adhesion between substrates, higher reliability and high image quality, and, and the manufacturing method thereof will be described. Specifically, in this embodiment mode, a liquid crystal display device using a thin film transistor having a crystalline semiconductor film according to the present invention will be described.

Figure 12A:
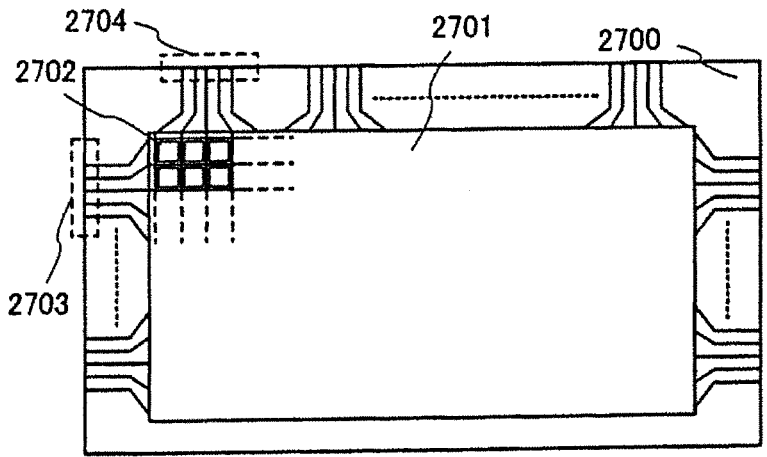
FIGS. 12A to 12C are top views illustrating a liquid crystal display device of the present invention.

FIG. 12A is a top view illustrating a structure of a display panel according to the present invention. A pixel portion 2701 in which pixels 2702 are arranged in matrix, a scan line input terminal 2703, and a signal line input terminal 2704 are formed over a substrate 2700 having an insulating surface. The number of pixels may be determined in accordance with various standards. In a case of XGA full-color display using RGB, the number of pixels may be 1024×768×3 (RGB). In a case of UXGA full-color display using RGB, the number of pixels may be 1600×1200×3 (RGB), and in a case of full-spec, high-definition, and full-color display using RGB, the number of pixels may be 1920×1080×3 (RGB).

The pixels 2702 are formed in matrix by intersections of scan lines extended from the scan line input terminal 2703 and signal lines extended from the signal line input terminal 2704. Each pixel in the pixel portion 2701 is provided with a switching element and a pixel electrode layer connected thereto. A typical example of the switching element is a TFT. A gate electrode layer of the TFT is connected to the scan line, and a source or a drain of the TFT is connected to the signal line, which enables each pixel to be independently controlled by a signal inputted from the outside.

Figure 13A:
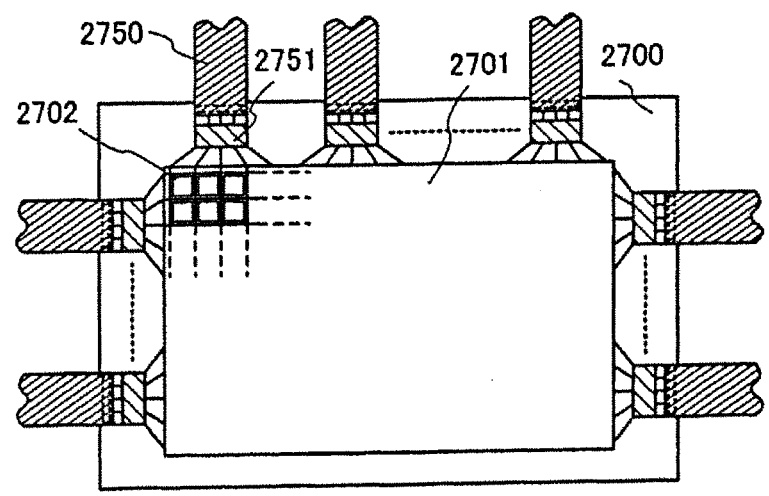
FIGS. 13A and 13B are top views illustrating a liquid crystal display device of the present invention.
Figure 13B:
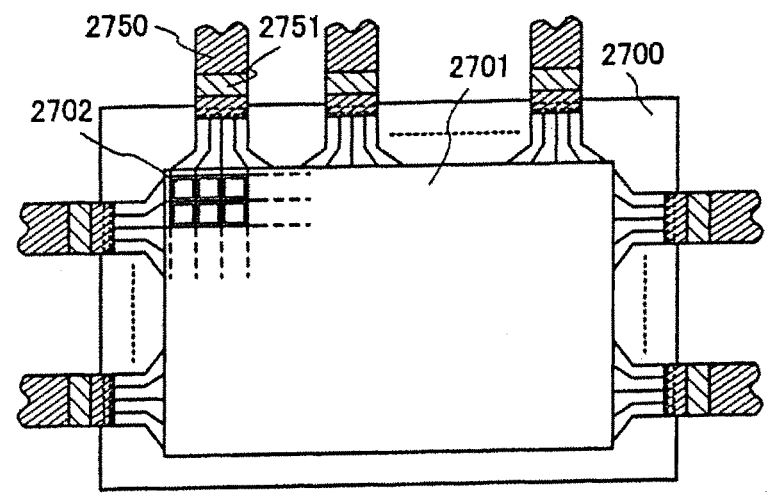

FIG. 12A illustrates a structure of a display panel in which a signal to be inputted to the scan line and the signal line is controlled by an external driver circuit. Alternatively, a driver IC 2751 may be mounted on the substrate 2700 by a COG (Chip on Glass) method as illustrated in FIG. 13A. As another mounting mode, a TAB (Tape Automated Bonding) method may be used as illustrated in FIG. 13B. The driver IC may be formed over a single crystalline semiconductor substrate or may be formed using a TFT over a glass substrate. In each of FIGS. 13A and 13B, the driver IC 2751 is connected to an FPC (Flexible Printed Circuit) 2750.

Figure 12B:
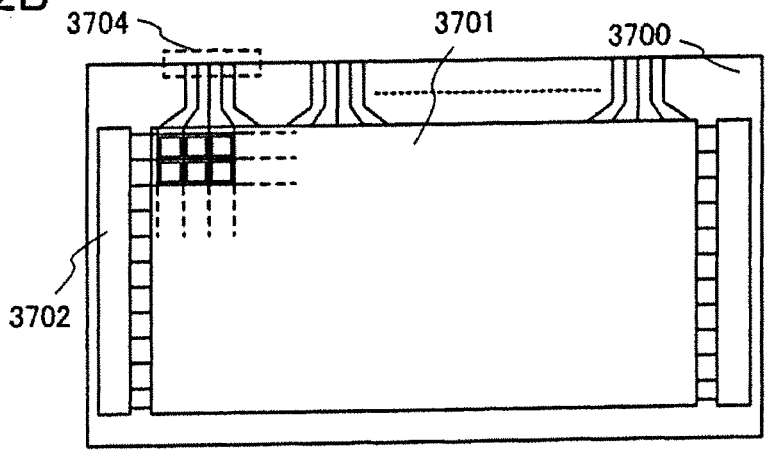
Figure 12C:
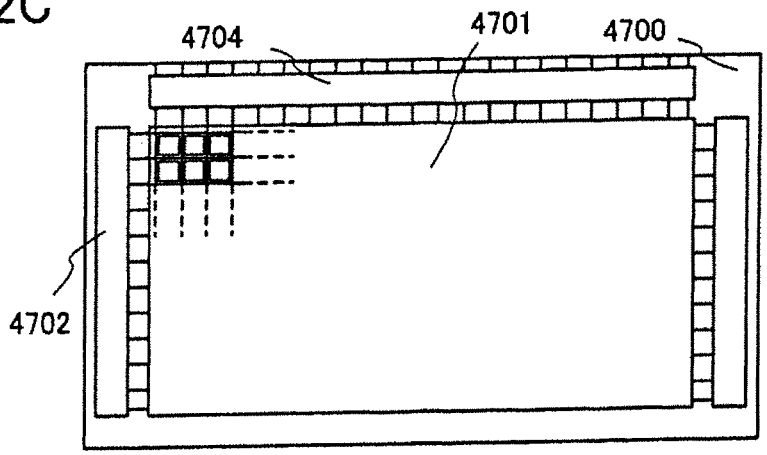

When a TFT provided in a pixel is formed of a crystalline semiconductor, a scanning line driver circuit 3702 can be formed over a substrate 3700 as illustrated in FIG. 12B. In FIG. 12B, a pixel portion 3701 is controlled by an external driver circuit connected to a signal line input terminal 3704, similarly to FIG. 12A. When the TFT provided in a pixel is formed of a polycrystalline (microcrystalline) semiconductor, a single crystalline semiconductor, or the like having high mobility, a pixel portion 4701, a scanning line driver circuit 4702, and a signal-line driver circuit 4704 can all be formed over a substrate 4700 as illustrated in FIG. 12C.

Figures 8A, 8B:
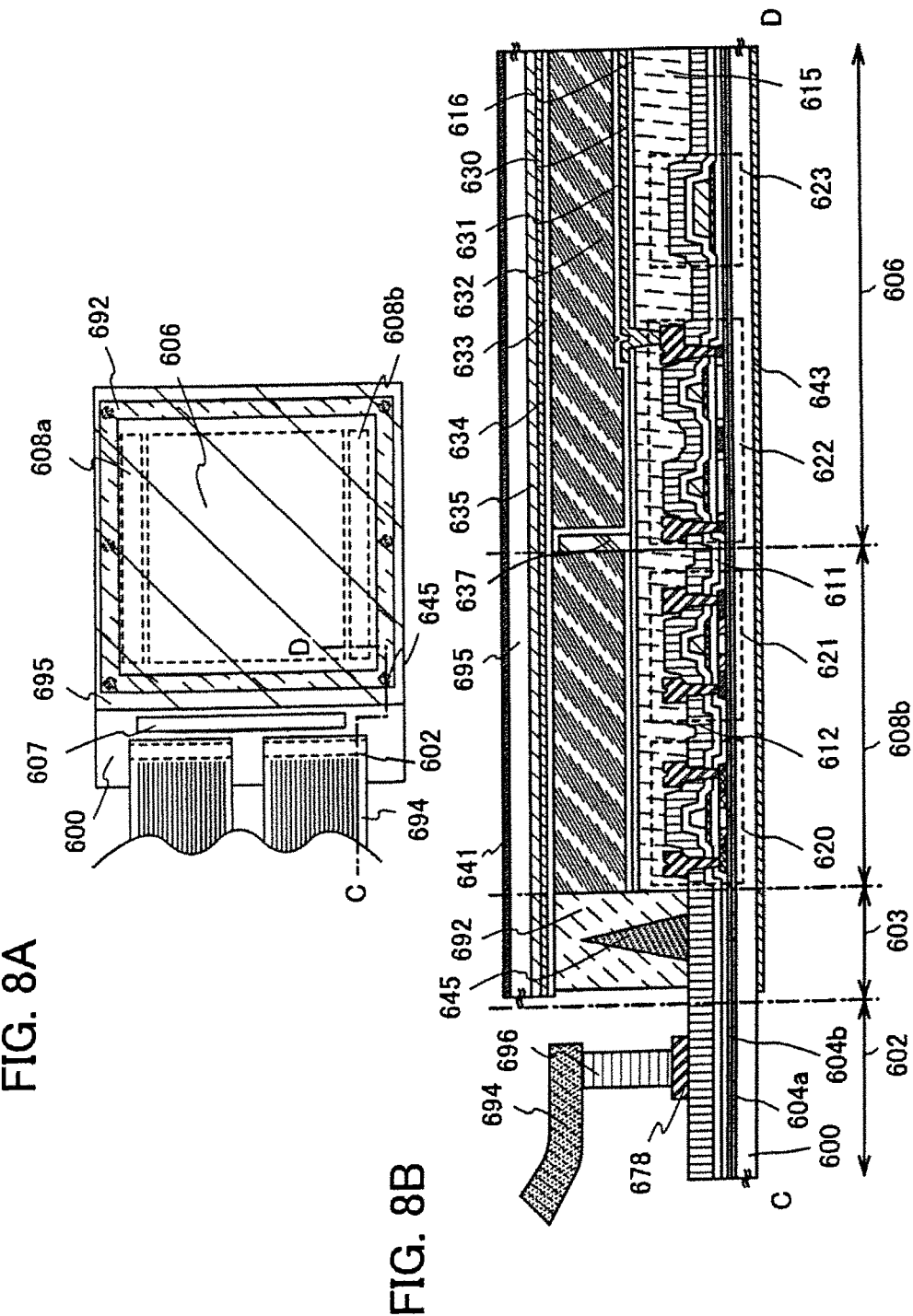
FIGS. 8A and 8B are a top view and a cross sectional view illustrating a liquid crystal display device of the present invention, respectively.

FIG. 8A is a top view of a liquid crystal display device in this embodiment mode using the present invention. FIG. 8B is a cross sectional view taken along a line C-D in FIG. 8A.

As illustrated in FIGS. 8A and 8B, a pixel region 606, a driving circuit region 608*a* which is a scanning line driving circuit, and a driving circuit region 608*b* which is a scanning line driving region are sealed with a sealant 692 between an element substrate 600 and a counter substrate 695. A driving circuit region 607 which is a signal line driving circuit formed with an IC driver is provided over the substrate 600. A transistor 622 and a capacitor 623 are provided in the pixel region 606. A driving circuit having transistors 620 and 621 is provided in the driving circuit region 608*b*.

The substrate 600 and the counter substrate 695 are insulating substrates with a light-transmitting property (hereinafter, also referred to as a light-transmitting substrate). The substrate particularly transmits light in a wavelength region of visible light. For example, a glass substrate such as a barium borosilicate glass or aluminoborosilicate glass, a quartz substrate, or the like can be used. Alternatively, a substrate formed from plastics typified by polyethylene terephthalate (PET), polyethylene naphthalate (PEN), polyethersulfone (PES), and polycarbonate (PC); or a substrate formed from a flexible synthetic resin such as acrylic can be employed. Further alternatively, a film (formed from polypropylene, polyester, vinyl, polyvinyl fluoride, or vinyl chloride), a base film (formed from polyester, polyamide, or an inorganic evaporated film), and the like may be used. Although there is a concern that a substrate formed from a synthetic resin generally has a low heat-resistance temperature compared to another substrate, the substrate formed from a synthetic resin can be used when a manufacturing process is carried out with a substrate with high heat resistance and then the substrate with high heat resistance is replaced with the substrate formed from a synthetic resin.

In the pixel region 606, a transistor 622 serving as a switching element is provided, with base films 604*a* and 604*b* interposed therebetween.

The base films 604*a* and 604*b* may be formed using a material of an acrylic acid, a methacrylic acid, or derivatives thereof; a heat-resistant high-molecular compound such as polyimide, aromatic polyamide, or polybenzimidazole; or a siloxane resin. Alternatively, a resin material such as a vinyl resin like polyvinyl alcohol or polyvinylbutyral, an epoxy resin, a phenol resin, a novolac resin, an acrylic resin, a melamine resin, or a urethane resin may be used. Further, an organic material such as benzocyclobutene, parylene, fluorinated arylene ether, or polyimide, a composition material containing a water-soluble homopolymer and a water-soluble copolymer, or the like may be used. Moreover, an oxazole resin can be used, and for example, a photo-curing polybenzoxazole or the like can be used.

The base films 604*a* and 604*b* can be formed by a sputtering method, a PVD (physical vapor deposition) method, a CVD (chemical vapor deposition) method such as a low-pressure CVD (LPCVD) method or a plasma CVD method, or the like. Further, a droplet discharge method, a printing method (a method for forming a pattern such as screen printing or offset printing), a coating method such as a spin coating method, a dipping method, a dispenser method, or the like can also be used.

In this embodiment mode, the transistor 622 is a multi-gate thin film transistor (TFT), which includes a semiconductor layer including impurity regions that function as a source region and a drain region, a gate insulating layer, a gate electrode layer having a stacked structure of two layers, and a source electrode layer and a drain electrode layer. The source electrode layer or the drain electrode layer is in contact with and electrically connects the impurity region of the semiconductor layer and a pixel electrode layer 630. A thin film transistor can be manufactured by many methods. For example, a crystalline semiconductor film is employed as an active layer. A gate electrode is provided over a crystalline semiconductor film with a gate insulating film interposed therebetween. An impurity element can be added to the active layer using the gate electrode. By addition of an impurity element using the gate electrode in this manner, a mask does not need to be formed for addition of an impurity element. The gate electrode can have a single-layer structure or a stacked structure. The impurity region can be formed into a high-concentration impurity region and a low-concentration impurity region by controlling the concentration thereof. A thin film transistor having a low-concentration impurity region in this manner is referred to as an LDD (lightly doped drain) structure. The low-concentration impurity region can be formed so as to overlap with the gate electrode, and such a thin film transistor is referred to as a GOLD (gate overlapped LDD) structure. The polarity of the thin film transistor is made to be n-type through addition of phosphorus (P) or the like to an impurity region thereof. In a case where a p-type thin film transistor is formed, boron (B) or the like may be added. After that, an insulating film 611 and an insulating film 612 are formed to cover the gate electrode and the like. Dangling bonds of the crystalline semiconductor film can be terminated by a hydrogen element mixed in the insulating film 611 (and the insulating film 612).

In order to further improve planarity, an insulating film 615 and an insulating film 616 may be formed as interlayer insulating films. The insulating films 615 and 616 can be formed using an organic material, an inorganic material, or a stacked structure thereof. For example, the insulating films 615 and 616 can be formed of a material selected from substances including an inorganic insulating material such as silicon oxide, silicon nitride, silicon oxynitride, silicon nitride oxide, aluminum nitride, aluminum oxynitride, aluminum nitride oxide having a higher content of nitrogen than that of oxygen, aluminum oxide, diamond-like carbon (DLC), polysilazane, a nitrogen-containing carbon (CN), PSG (phosphosilicate glass), BPSG (borophosphosilicate glass), and alumina. Alternatively, an organic insulating material may be used; an organic insulating material may be either photosensitive or non-photosensitive; and polyimide, acrylic, polyamide, polyimide amide, a resist, benzocyclobutene, a siloxane resin, or the like can be used. Note that the siloxane resin corresponds to a resin having Si—O—Si bonds. Siloxane has a skeleton structure formed from a bond of silicon (Si) and oxygen (O).

As a substituent, an organic group containing at least hydrogen (for example, an alkyl group or an aryl group) is used. A fluoro group may be used as the substituent. Alternatively, an organic group containing at least hydrogen and a fluoro group may be used as the substituent.

The pixel region and the driver circuit region can be formed over the same substrate with the use of a crystalline semiconductor film. In that case, the transistor in the pixel region and the transistor in the driver circuit region 608b are formed simultaneously. The transistor used in the driver circuit region 608b constitutes a part of a CMOS circuit. Although the thin film transistor included in the CMOS circuit has a GOLD structure, it may have an LDD structure like the transistor 622.

Without limitation to this embodiment mode, the thin film transistor of the pixel region may have a single-gate structure in which a single channel formation region is formed, a double-gate structure in which two channel formation regions are formed, or a triple-gate structure in which three channel formation regions are formed. In addition, the thin film transistor of a peripheral driver circuit region may also have a single-gate structure, a double-gate structure, or a triple-gate structure.

Note that without limitation to the manufacturing method of a thin film transistor described in this embodiment mode, the present invention can be used in a top-gate structure (such as a staggered structure), a bottom-gate structure (such as an inversely staggered structure), a dual-gate structure including two gate electrode layers provided above and below a channel region each with a gate insulating film interposed therebetween, or another structure.

Next, an insulating layer 631 serving as an alignment film is formed by a printing method or a droplet discharging method to cover the pixel electrode layer 630 and the insulating film 616. Note that the insulating layer 631 can be formed as selected by a screen printing method or an offset printing method. After that, rubbing treatment is performed. An insulating layer 633 serving as an alignment film is similar to the insulating layer 631 serving as an alignment film. Then, the sealant 692 is formed by a droplet discharging method in a peripheral region of the pixel region.

The insulating layer serving as an alignment film can be formed using polyimide, polyamide, or the like. The insulating layer can serve as the alignment film by being subjected to rubbing treatment, but it is not limited as long as the insulating layer can serve as an alignment film which aligns liquid crystal molecules in one direction. Light irradiation or heat treatment may be performed on the insulating layer to form an alignment film.

The liquid crystal may be dropped to the element substrate 600. The sealant 692 is provided for the counter substrate 695 provided with a colored layer 635 serving as a color filter and the liquid crystal may be dropped. Accordingly, the sealant may be provided for either the element substrate 600 or the counter substrate 695 and the liquid crystal may be dropped to either the element substrate 600 or the counter substrate 695. In this embodiment mode, the sealant is provided for the counter substrate 695 provided with the insulating layer 633 serving as an alignment film, a counter electrode layer 634 and the colored layer 635 serving as a color filter, a first cure treatment is performed to a surface of the sealant and the liquid crystal is dropped. In this embodiment mode, a plurality of projections 645 are provided over the substrate 600 which is not provided with the sealant.

Similarly to Embodiment Mode 1, in this embodiment mode using the present invention, a surface of an uncured sealant formed over the substrate 695 is cured by the first cure treatment before dropping liquid crystal in a method for manufacturing a liquid crystal display device in which the liquid crystal is dropped by a dropping method to form the liquid crystal layer 632. After dropping the liquid crystal, the substrate 695 and the substrate 600 are attached to each other with the liquid crystal and a space 637 interposed therebetween. Then, the sealant 692 is subjected to a second cure treatment to be cured wholly. In this embodiment mode, the substrate 600 has a plurality of projections 645 in an adhesive region of the sealant 692. The substrate 600 and the substrate 695 are attached to each other with the liquid crystal layer 632 interposed therebetween so that the plurality of projections 645 is implanted in the sealant formed over the substrate 695.

Since a surface of the sealant is cured by the first cure treatment, the liquid crystal is not in contact with the uncured sealant. Accordingly, contamination of the liquid crystal due to the uncured sealant can be prevented. Therefore, reduction in reliability of the liquid crystal display device caused by deterioration of the liquid crystal can be prevented. The liquid crystal display device with reduced display unevenness, a reduced display defect and high image quality can be realized.

In this embodiment mode, although the surface of the sealant is cured by the first cure treatment, an inside of the sealant is still in an uncured state in which adhesiveness is high. Since an adhesive region of the sealant 692 formed over the substrate 600 is provided with the plurality of projections 645, when the substrate 695 and the substrate 600 are attached to each other, the plurality of projections 645 is implanted in the sealant. The projections 645 physically destroy the surface of the sealant of which adhesiveness is lowered by cure treatment and penetrate the inside of the sealant, so that the projections can be in contact with the uncured sealant with high adhesiveness. Accordingly, the second cure treatment is performed in a state where the plurality of projections 645 is implanted in the sealant and the sealant 692 is wholly cured, whereby the substrate 695 and the substrate 600 can be attached firmly to each other and can stick to each other. Adhesiveness between the substrate 695 and the substrate 600 can be improved and reliability of the liquid crystal display device can be improved.

In this embodiment mode, cure treatment is performed at least twice or more; the first cure treatment is treatment in which only the surface of the sealant is cured and the second cure treatment is treatment in which the sealant is wholly cured in a state where the projections 645 are implanted in the sealant. Each of the first cure treatment and the second cure treatment may be performed once or a plurality of times. The same treatment may be performed (for example, light irradiation treatment is performed twice) or the different treatments may be performed (for example, the first is light irradiation treatment and the second is heat treatment) as the cure treatments.

As the cure treatment, light irradiation treatment using ultraviolet rays, or the like or heat treatment may be performed. When an ultraviolet curing resin is used as the sealant, the ultraviolet curing resin is cured by an ultraviolet irradiation treatment. When a thermosetting resin is used, heat treatment may be performed. In addition, heat treatment may be performed to the ultraviolet curing resin. Light for light irradiation may be light emitted from a lamp or laser light. A method and conditions (energy, time, pressure, atmosphere, and the like) of an irradiation treatment may be set as appropriate in accordance with a material used for the sealant. Further, a method and conditions (temperature, time, pressure, atmosphere, and the like) of heat treatment may also be set as appropriate in accordance with a property of the sealant.

The projections 645 physically destroy the cured region which is a surface of the sealant. It is acceptable as long as the projections 645 have strength and height with which the projections can reach the uncured region inside the sealant, and there is no particular limitation on a material and a shape used for the projections. The projections 645 preferably have shapes with a function as a wedge so that the projections are easily implanted in the sealant and adhesion between the projections and the sealant is improved. A pyramid shape such as a pointed needle-like shape (e.g. a cone shape and a polygonal pyramid), a triangular pole of which side surface is provided so as to be in contact with the substrate, or the like can be used.

The projections 645 may be formed using the same material as a component of the liquid crystal display device and in the same process as the liquid crystal display device. Further, only the projections 645 may be formed in a different process. In this embodiment mode, the plurality of projections 645 with a needle-like shape are provided over the insulating film 612.

Further, asperity may be formed so that the function of the projection as a wedge can be improved by processing a surface of the projection 645. When the projection 645 has an anchor effect of functioning as a wedge, the substrate 695 and the substrate 600 can be attached more firmly. The asperity may be formed by addition of physical force or impact to the projection 645. The projection 645 may be changed partially (being dissolved partially, or the like) by a chemical treatment (corrosion, or the like of a surface by a solution with a corrosion effect) or heating to form the asperity.

The plurality of projections 645 may be formed by processing the substrate or may also be formed over the substrate by formation of a film, or the like. Alternatively, the projections 645 may be formed in a different process and attached to the substrate with an adhesive agent, or the like. As a substrate over which the projections 645 are provided, a glass substrate and a quartz substrate, or the like can be used. A flexible substrate may also be used. The flexible substrate indicates a substrate that can be bent. As the flexible substrate, a high-molecular material elastomer, which can be processed to be shaped similarly to plastic by plasticization at high temperature, and has a property such as an elastic body like rubber at room temperature, or the like can be given in addition to a plastic substrate made of polycarbonate, polyarylate, polyethersulfone, or the like. Alternatively, a film (made of polypropylene, polyester, vinyl, polyvinyl fluoride, vinyl chloride, or the like) or an inorganic vapor deposition film can be used. In this manner, the liquid crystal display device of the present invention can be formed employing various shapes having the plurality of projections.

A material for forming the projection 645 may be an inorganic material or an organic material and may be an insulating material or a conductive material. For example, as a material for forming the projection 645, silicon, nitrogen, fluorine, oxide, nitride, fluoride, or the like can be used. As oxide, the following can be used: silicon oxide, boric oxide, sodium oxide, magnesium oxide, aluminum oxide (alumina), potassium oxide, calcium oxide, diarsenic trioxide (arsenious oxide), strontium oxide, antimony oxide, barium oxide, indium tin oxide (ITO), zinc oxide (ZnO), indium zinc oxide (IZO) in which zinc oxide (ZnO) is mixed in indium oxide, a conductive material in which silicon oxide is mixed in indium oxide, organic indium, organic tin, indium oxide containing tungsten oxide, indium zinc oxide containing tungsten oxide, indium oxide containing titanium oxide, indium tin oxide containing titanium oxide, or the like. As the nitride, aluminum nitride, silicon nitride, or the like can be used. As the fluoride, lithium fluoride, sodium fluoride, magnesium fluoride, calcium fluoride, lanthanum fluoride, or the like can be used. The material used for the projections may include one or more kinds of the above-described silicon, nitrogen, fluorine, oxide, nitride, and fluoride. The above-described materials used for the substrate can also be used.

As other materials used for the projection 645, a high molecule such as polyimide, aromatic polyamide, or polybenzimidazole; or a siloxane resin may be used. Alternatively, a resin material such as a vinyl resin like polyvinyl alcohol or polyvinylbutyral, an epoxy resin, a phenol resin, a novolac resin, an acrylic resin, a melamine resin, or a urethane resin may be used. In addition, metal such as Ag, Au, Cu, Ni, Pt, Pd, Ir, Rh, W, or Al, metal sulfide such as Cd or Zn, an oxide of Fe, Ti, Si, Ge, Zr, Ba, or the like, or a mixture of the materials may also be used.

The plurality of projections 645 can be formed in a manner such that a thin film is formed by a sputtering method, a vacuum evaporation method, a PVD (physical vapor deposition) method, or a CVD (Chemical Vapor Deposition) method such as a low-pressure CVD (LPCVD) method or a plasma CVD method, and then etched into a desired shape. Alternatively, a droplet discharging method by which a pattern can be formed as selected, a printing method by which a pattern can be transferred or drawn (a method for forming a pattern such as screen printing or offset printing), a coating method, such as a spin coating method, a dipping method, a dispenser method, a brush coating method, a spraying method, a flow coating method, or the like can be employed. Still alternatively, an imprinting technique or a nanoimprinting technique with which a nanoscale three-dimensional structure can be formed by a transfer technology can be employed. Imprinting and nanoimprinting are techniques for forming a minute three-dimensional structure without using a photolithography process.

A spacer 637 which controls a distance between the substrate 695 and the substrate 600 may be formed in the sealant formation regions of the substrate 695 and the substrate 600.

After the substrate 695 and the substrate 600 are attached to each other with the filled liquid crystal layer 632 interposed therebetween, the sealant is preferably cured and subjected to heat treatment. By heat treatment, the sealant is further cured, so that the adhesive strength can be improved and orientation disorder of the liquid crystal can be corrected. A process of attaching is preferably conducted under a reduced pressure.

As the sealant, typically, a visible light curable resin, an ultraviolet curable resin, or a thermosetting resin can be used. For example, an epoxy resin such as a bisphenol-A liquid resin, a bisphenol-A solid resin, a bromine-containing epoxy resin, a bisphenol-F resin, a bisphenol-AD resin, a phenol resin, a cresol resin, a novolac resin, a cycloaliphatic epoxy resin, an Epi-Bis type epoxy resin, a glycidyl ester resin, a glycidyl amine resin, a heterocyclic epoxy resin, or a modified epoxy resin can be used. The uncured sealant can be formed using a droplet discharging method by which a pattern can be formed as selected, a printing method by which a pattern can be transferred or drawn (a method for forming a pattern, such as screen printing or offset printing), a dispenser method, or the like.

Then, a polarizing plate 641 is provided to the outer side of the counter substrate 695 and a polarizing plate 643 is provided to the opposite side of the substrate 600 from the element. The polarizing plate can be attached to the substrate with use of an adhesive layer. A retardation plate may be provided between the polarizing plate and the substrate. A filler may be mixed into the sealant, and the counter substrate 695 may be provided with a shielding film (black matrix) or the like. Note that a color filter or the like may be formed of materials which exhibit red (R), green (G), and blue (B) in the case where the liquid crystal display device is a full-color display; and the colored layer may be omitted or may be formed of a material which exhibits at least one color in the case where the liquid crystal display device is a single-color display.

Note that the color filter is not always provided in the case where light-emitting diodes (LEDs) of RGB or the like are arranged in a backlight unit and a successive additive color mixing method (field sequential method) in which color display is performed by time division is employed. The black matrix is preferably provided so as to overlap with a transistor and a CMOS circuit for the sake of reducing reflection of external light by wirings of the transistor and the CMOS circuit. Note that the black matrix may be provided so as to overlap with a capacitor. This is because reflection by a metal film included in the capacitor can be prevented.

While the spacer may be provided in such a way that particles having a size of several micrometers are sprayed, the spacer in this embodiment mode is formed by a method in which a resin film is formed over the entire surface of the substrate and then etched. A material of the spacer is applied by a spinner and then subjected to light exposure and development to form a predetermined pattern. In addition, the material is heated at 150° C. to 200° C. in a clean oven or the like so as to be hardened. The thus manufactured spacer can have various shapes depending on the conditions of the light exposure and development. It is preferable that the spacer have a columnar shape with a flat top so that mechanical strength of the liquid crystal display device can be secured when the counter substrate is attached. The shape of the spacer can be conical, pyramidal, or the like, and there is no particular limitation thereon. The spacer may be provided in the sealant formation regions (sealant adhesive regions) of the first substrate (the substrate 695) and the second substrate (the substrate 600).

Then, a terminal electrode layer 678 electrically connected to the pixel region is attached to an FPC 694 which is a wiring board for connection, through an anisotropic conductive layer 696. The FPC 694 transmits external signals or potential. Through the foregoing steps, a liquid crystal display device having a display function can be manufactured.

A wiring and a gate electrode layer which are included in a transistor, the pixel electrode layer 630, and the counter electrode layer 634 are formed using one or a plurality of the following; indium tin oxide (ITO), indium zinc oxide (IZO) in which zinc oxide (ZnO) is mixed into indium oxide, a conductive material in which silicon oxide ($SiO_2$) is mixed into indium oxide, organic indium, organic tin, indium oxide containing tungsten oxide, indium zinc oxide containing tungsten oxide, indium oxide containing titanium oxide, or indium tin oxide containing titanium oxide; or metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminium (Al), copper (Cu), or silver (Ag), or alloy or nitride of any of those metals.

In the case of a transmissive liquid crystal display device, a light transmitting conductive material may be used for the pixel electrode layer 630 and the counter electrode layer 634. In the case of a reflective liquid crystal display device, a reflective layer may be additionally provided. Alternatively, a reflective conductive material is used for the pixel electrode layer 630 and a light transmitting conductive material is used for the counter electrode layer 634 so that light reflected by the pixel electrode layer 630 passes through the counter electrode layer 634 and is emitted from the viewing side.

The source electrode layer or the drain electrode layer may be connected to the pixel electrode layer through a wiring layer so as to be electrically connected instead of being directly in contact with each other. Alternatively, the pixel electrode layer may be partially stacked over the source electrode layer or the drain electrode layer. Further alternatively, the pixel electrode layer may be formed first and then the source electrode layer or the drain electrode layer may be formed to be in contact with the pixel electrode layer.

While the foregoing circuits are used in this embodiment mode, the present invention is not limited thereto and an IC chip may be mounted as a peripheral driver circuit by a COG method or a TAB method which are described above. Further, a gate line driver circuit and a source line driver circuit may be provided or pluralities of the gate line driver circuits and source line driver circuits may be provided.

In the liquid crystal display device of the present invention, there is no particular limitation on a driving method for image display, and for example, a dot sequential driving method, a line sequential driving method, an area sequential driving method, or the like may be used. Typically, the line sequential driving method is used, and a time division gray scale driving method or an area gray scale driving method may be used as appropriate. Further, an image signal inputted to the source line of the liquid crystal display device may be either an analog signal or a digital signal. The driver circuit and the like may be designed as appropriate depending on the image signal.

Accordingly, in the liquid crystal display device of this embodiment mode using the present invention, deterioration of the liquid crystal which is caused in the manufacturing process can be prevented and the liquid crystal display device can have good adhesion between substrates, high reliability and high image quality. Further, such a liquid crystal display device with high reliability and high image quality can be manufactured with high productivity.

This embodiment mode can be freely combined with Embodiment Mode 1.

Embodiment Mode 5

In this embodiment mode, an example of a liquid crystal display device in which deterioration of liquid crystal caused in a manufacturing process is prevented and which has higher reliability, higher image quality, and good adhesion between substrates, and the manufacturing method thereof will be described. Specifically, in this embodiment mode, a liquid crystal display device according to the present invention using a thin film transistor having an amorphous semiconductor film will be described.

Figure 9:
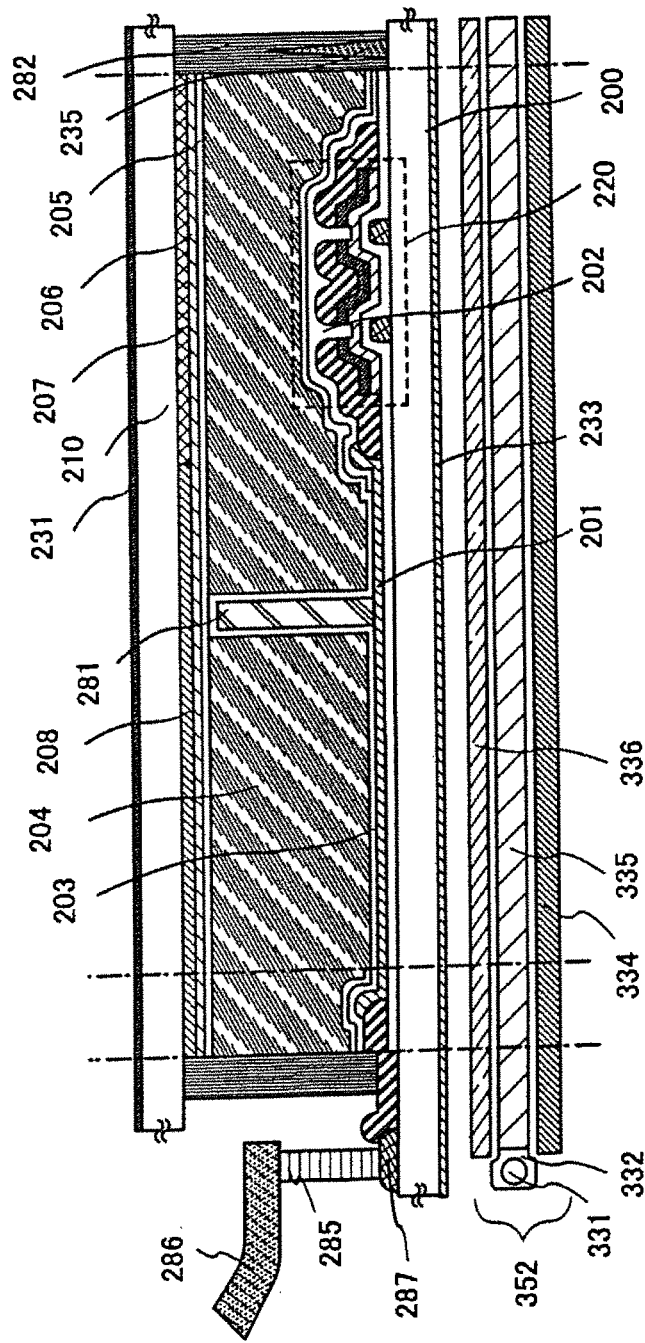
FIG. 9 is a cross sectional view illustrating a liquid crystal display device of the present invention.

A liquid crystal display device illustrated in FIG. 9 includes, over an element substrate 200, a transistor 220 which is an inversely staggered thin film transistor, a pixel electrode layer 201, an insulating film 202, an insulating layer 203 serving as an alignment film, a liquid crystal layer 204, a spacer 281, an insulating layer 205 serving as an alignment film, a counter electrode layer 206, a color filter 208, a black matrix 207, a counter substrate 210, and polarizing plates 231 and 233 in a pixel region; and includes a sealant 282, a terminal electrode layer 287, an anisotropic conductive layer 285, and an FPC 286 in a sealing region.

The insulating layer serving as an alignment film can be formed using polyimide, polyamide, or the like. The insulating layer can serve as the alignment film by being subjected to rubbing treatment, but it is not limited as long as the insulating layer can serve as an alignment film which aligns liquid crystal molecules in one direction. Light irradiation or heat treatment may be performed on the insulating layer to form an alignment film.

The liquid crystal may be dropped to the element substrate 200. The sealant 282 is formed over the counter substrate 210 and the liquid crystal may be dropped. Accordingly, the sealant may be provided for either the element substrate 200 or the counter substrate 210 and the liquid crystal may be dropped to either the element substrate 200 or the counter substrate 210. In this embodiment mode, the sealant is provided for the counter substrate 210, a first cure treatment is performed to a surface of the sealant and the liquid crystal is dropped. In this embodiment mode, a plurality of projections 235 are provided over the substrate 200 which is not provided with the sealant. The projections 235 are formed so as to avoid a formation region of a wiring layer which is connected to the terminal electrode layer 287.

Similarly to Embodiment Mode 1, in this embodiment mode using the present invention, a surface of an uncured sealant formed over the substrate 210 is cured by the first cure treatment before dropping liquid crystal in a method for manufacturing a liquid crystal display device in which the liquid crystal is dropped by a dropping method to form the liquid crystal layer 204. After dropping the liquid crystal, the substrate 210 and the substrate 200 are attached to each other with the liquid crystal and the spacer 281 interposed therebetween. Then, the sealant 282 is subjected to a second cure treatment to be cured wholly. In this embodiment mode, the substrate 200 has a plurality of projections 235 in an adhesive region of the sealant 282. The substrate 200 and the substrate 210 are attached to each other with the liquid crystal interposed therebetween so that the plurality of projections 235 is implanted in the sealant formed over the substrate 210.

Since a surface of the sealant is cured by the first cure treatment, the liquid crystal is not in contact with the uncured sealant. Accordingly, contamination of the liquid crystal due to the uncured sealant can be prevented. Therefore, reduction in reliability of the liquid crystal display device caused by deterioration of the liquid crystal can be prevented. The liquid crystal display device with reduced display unevenness, a reduced display defect and high image quality can be realized.

In this embodiment mode, although the surface of the sealant is cured by the first cure treatment, an inside of the sealant is still in an uncured state in which adhesiveness is high. Since an adhesive region of the sealant 282 of the substrate 200 is provided with the plurality of projections 235, when the substrate 210 and the substrate 200 are attached to each other, the plurality of projections 235 is implanted in the sealant. The projections 235 physically destroy the surface of the sealant of which adhesiveness is lowered by cure treatment and penetrate the inside of the sealant, so that the projections can be in contact with the uncured sealant with high adhesiveness, Accordingly, the second cure treatment is performed in a state where the plurality of projections 235 is implanted in the sealant and the sealant 282 is wholly cured, whereby the substrate 210 and the substrate 200 can be attached firmly to each other and can stick to each other. Adhesiveness between the substrate 210 and the substrate 200 can be improved and reliability of the liquid crystal display device can be improved.

In this embodiment mode, cure treatment is performed at least twice or more; the first cure treatment is treatment in which only the surface of the sealant is cured and the second cure treatment is treatment in which the sealant is wholly cured in a state where the projections 235 are implanted in the sealant. Each of the first cure treatment and the second cure treatment may be performed once or a plurality of times. The same treatment may be performed (for example, light irradiation treatment is performed twice) or the different treatments may be performed (for example, the first is light irradiation treatment and the second is heat treatment) as the cure treatments.

As the cure treatment, light irradiation treatment using ultraviolet rays, or the like or heat treatment may be performed. When an ultraviolet curing resin is used as the sealant, the ultraviolet curing resin is cured by an ultraviolet irradiation treatment. When a thermosetting resin is used, heat treatment may be performed. In addition, heat treatment may be performed to the ultraviolet curing resin. Light for light irradiation may be light emitted from a lamp or laser light. A method and conditions (energy, time, pressure, atmosphere, and the like) of an irradiation treatment may be set as appropriate in accordance with a material used for the sealant. Further, a method and conditions (temperature, time, pressure, atmosphere, and the like) of heat treatment may also be set as appropriate in accordance with a property of the sealant.

The projections 235 physically destroy the cured region which is a surface of the sealant. It is acceptable as long as the projections 645 have strength and height with which the projections can reach the uncured region inside the sealant, and there is no particular limitation on a material and a shape used for the projections. The projections 235 preferably have shapes with a function as a wedge so that the projections are easily implanted in the sealant and adhesion between the projections and the sealant is improved. A pyramid shape such as a pointed needle-like shape (e.g. a cone shape and a polygonal pyramid), a triangular pole of which side surface is provided so as to be in contact with the substrate, or the like can be used.

The projections 235 may be formed using the same material as a component of the liquid crystal display device and in the same process as the liquid crystal display device. Further, only the projections 235 may be formed in a different process. In this embodiment mode, the plurality of projections 235 with a needle-like shape are provided over the substrate 200.

Further, asperity may be formed so that the function of the projection as a wedge can be improved by processing a surface of the projection 235. When the projection 235 has an anchor effect of functioning as a wedge, the substrate 210 and the substrate 200 can be attached to each other more firmly. The asperity may be formed by addition of physical force or impact to the projection 235. The projection 235 may be formed by being changed partially (being dissolved partially, or the like) by a chemical treatment (corrosion, or the like of a surface by a solution with a corrosion effect) or heating to form the asperity.

The plurality of projections 235 may be formed by processing the substrate or may also be formed over the substrate by formation of a film, or the like. Alternatively, the projections 235 may be formed in a different process and attached to the substrate with an adhesive agent, or the like. As a substrate over which the projections 235 are provided, a glass substrate, a quartz substrate, or the like can be used. A flexible substrate may also be used. The flexible substrate indicates a substrate that can be bent. As the flexible substrate, a high-molecular material elastomer, which can be processed to be shaped similarly to plastic by plasticization at high temperature, and has a property such as an elastic body like rubber at room temperature, or the like can be given in addition to a plastic substrate made of polycarbonate, polyarylate, polyethersulfone, or the like. Alternatively, a film (made of polypropylene, polyester, vinyl, polyvinyl fluoride, vinyl chloride, or the like)

or an inorganic vapor deposition film can be used. In this manner, the liquid crystal display device of the present invention can be formed employing various shapes having the plurality of projections 235.

A material for forming the projection 235 may be an inorganic material or an organic material and may be an insulating material or a conductive material. For example, as a material for forming the projection 235, silicon, nitrogen, fluorine, oxide, nitride, fluoride, or the like can be used. As oxide, the following can be used: silicon oxide, boric oxide, sodium oxide, magnesium oxide, aluminum oxide (alumina), potassium oxide, calcium oxide, diarsenic trioxide (arsenious oxide), strontium oxide, antimony oxide, barium oxide, indium tin oxide (ITO), zinc oxide (ZnO), indium zinc oxide (IZO) in which zinc oxide (ZnO) is mixed in indium oxide, a conductive material in which silicon oxide is mixed in indium oxide, organic indium, organic tin, indium oxide containing tungsten oxide, indium zinc oxide containing tungsten oxide, indium oxide containing titanium oxide, indium tin oxide containing titanium oxide, or the like. As the nitride, aluminum nitride, silicon nitride, or the like can be used. As the fluoride, lithium fluoride, sodium fluoride, magnesium fluoride, calcium fluoride, lanthanum fluoride, or the like can be used. The material used for the projections may include one or more kinds of the above-described silicon, nitrogen, fluorine, oxide, nitride, and fluoride. The above-described materials used for the substrate can also be used.

As other materials used for the projection 235, a high molecule such as polyimide, aromatic polyamide, or polybenzimidazole; or a siloxane resin may be used. Alternatively, a resin material such as a vinyl resin like polyvinyl alcohol or polyvinylbutyral, an epoxy resin, a phenol resin, a novolac resin, an acrylic resin, a melamine resin, or a urethane resin may be used. In addition, metal such as Ag, Au, Cu, Ni, Pt, Pd, Ir, Rh, W, or Al, metal sulfide such as Cd or Zn, an oxide of Fe, Ti, Si, Ge, Zr, Ba, or the like, or a mixture of the materials may also be used.

The plurality of projections 235 can be formed in a manner such that a thin film is formed by a sputtering method, a vacuum evaporation method, a PVD (physical vapor deposition) method, or a CVD (Chemical Vapor Deposition) method such as a low-pressure CVD (LPCVD) method or a plasma CVD method, and then etched into a desired shape. Alternatively, a droplet discharging method by which a pattern can be formed as selected, a printing method by which a pattern can be transferred or drawn (a method for forming a pattern such as screen printing or offset printing), a coating method, such as a spin coating method, a dipping method, a dispenser method, a brush coating method, a spraying method, a flow coating method, or the like can be employed. Still alternatively, an imprinting technique or a nanoimprinting technique with which a nanoscale three-dimensional structure can be formed by a transfer technology can be employed. Imprinting and nanoimprinting are techniques for forming a minute three-dimensional structure without using a photolithography process.

A spacer 281 which controls a distance between the substrate 210 and the substrate 200 may be formed in the sealant formation regions of the substrate 210 and the substrate 200.

After the substrate 210 and the substrate 200 are attached to each other with the filled liquid crystal layer 204 interposed therebetween, the sealant is preferably cured and subjected to heat treatment. By heat treatment, the sealant is further cured, so that the adhesive strength can be improved and orientation disorder of the liquid crystal can be corrected. A process of attaching is preferably conducted under a reduced pressure.

As the sealant 282, typically, a visible light curable resin, an ultraviolet curable resin, or a thermosetting resin can be used. For example, an epoxy resin such as a bisphenol-A liquid resin, a bisphenol-A solid resin, a bromine-containing epoxy resin, a bisphenol-F resin, a bisphenol-AD resin, a phenol resin, a cresol resin, a novolac resin, a cycloaliphatic epoxy resin, an Epi-Bis type epoxy resin, a glycidyl ester resin, a glycidyl amine resin, a heterocyclic epoxy resin, or a modified epoxy resin can be used. The uncured sealant can be formed using a droplet discharging method by which a pattern can be formed as selected, a printing method by which a pattern can be transferred or drawn (a method for forming a pattern, such as screen printing or offset printing), a dispenser method, or the like.

A gate electrode layer, a source electrode layer, and a drain electrode layer of the inverted staggered thin film transistor 220 in this embodiment mode are formed by a droplet discharging method. A droplet discharging method is a method in which a composition including a conductive material in a liquid state is discharged and then solidified by drying and/or baking, whereby a conductive layer or an electrode layer is formed. When a composition containing an insulating material is discharged and then solidified by drying and/or baking, an insulating layer can also be formed. Because a component of a liquid crystal display device, such as a conductive layer or an insulating layer, can be formed as selected, steps are simplified and material loss can be prevented. Therefore, a liquid crystal display device can be manufactured at low cost with high productivity.

In this embodiment mode, an amorphous semiconductor is used as a semiconductor layer, and a semiconductor layer having one conductivity type may be formed if needed. In this embodiment mode, a semiconductor layer and an n-type amorphous semiconductor layer which is the semiconductor layer having one conductivity type are stacked. Further, an n-channel thin film transistor with an NMOS structure which includes an n-type semiconductor layer, a p-channel thin film transistor with a PMOS structure which includes a p-type semiconductor layer, or a CMOS structure which includes an n-channel thin film transistor and a p-channel thin film transistor can be manufactured. In this embodiment mode, the transistor 220 is an n-channel inverted staggered thin film transistor. The transistor 220 can be a channel protective type inverted staggered thin film transistor in which a protective layer is provided over the channel region of the semiconductor layer.

In addition, an n-channel thin film transistor or a p-channel thin film transistor can be formed by doping the semiconductor layer with an element imparting conductivity and forming an impurity region. Instead of formation of the n-type semiconductor layer, a plasma treatment may be performed with a $PH_3$ gas to impart conductivity to the semiconductor layer.

The semiconductor layer can be formed with use of an organic semiconductor material as a semiconductor, by a printing method, a spray method, a spin coating method, a droplet discharge method, a dispenser method, or the like. In this case, since an etching step is not always necessary, the number of steps can be reduced. As an organic semiconductor, a low molecular material such as pentacene or a high molecular material can be used, or a material such as an organic pigment or a conductive high molecular organic material can be used. As an organic semiconductor material used in the present invention, a π-conjugated high molecular material with its skeleton including a conjugate double bond is desirable. Typically, a soluble high molecular material such as polythiophene, polyfluorene, poly(3-alkylthiophene), or a polythiophene derivative can be used.

The structure of a backlight unit 352 will be described. The backlight unit 352 includes a light source 331 which emits light such as a cold cathode tube, a hot cathode fluorescent lamp, a light-emitting diode, an inorganic EL, or an organic EL, a lamp reflector 332 for effectively leading light to a light guiding plate 335, the light guiding plate 335 for totally reflecting light so that light is led to the entire surface of a liquid crystal display device, a diffusing plate 336 for reducing variations in brightness, and a reflector plate 334 for reusing light leaked under the light guiding plate 335.

A control circuit for adjusting luminance of the light source 331 is connected to the backlight unit 352. The luminance of the light source 331 can be controlled by a signal supplied from the control circuit.

Accordingly, in the liquid crystal display device of this embodiment mode using the present invention, deterioration of the liquid crystal which is caused in a manufacturing process can be prevented. Further, the liquid crystal display device with good adhesion between substrates, high reliability and high image quality can be realized. Moreover, such a liquid crystal display device with high reliability and high image quality can be manufactured with high productivity.

This embodiment mode can be freely combined with Embodiment Mode 1.

Embodiment Mode 6

This embodiment mode describes operation of circuits included in the liquid crystal display device according to the present invention.

Figure 14A:
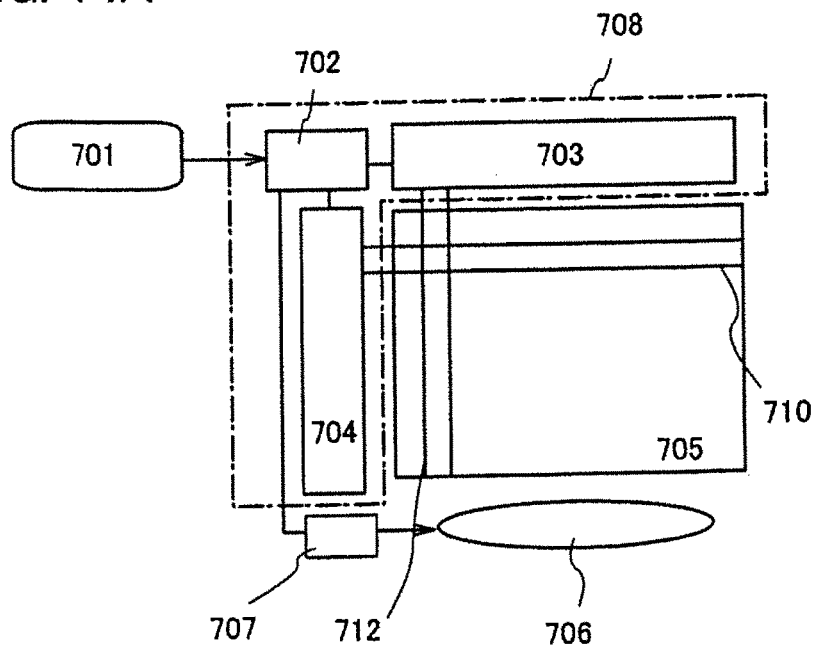
FIGS. 14A to 14C are block diagrams illustrating a liquid crystal display device of the present invention.
Figure 14B:
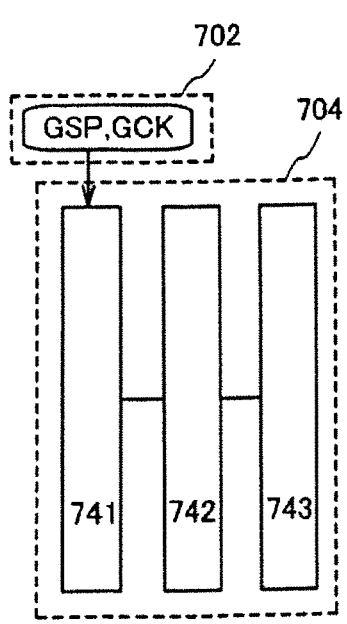
Figure 14C:
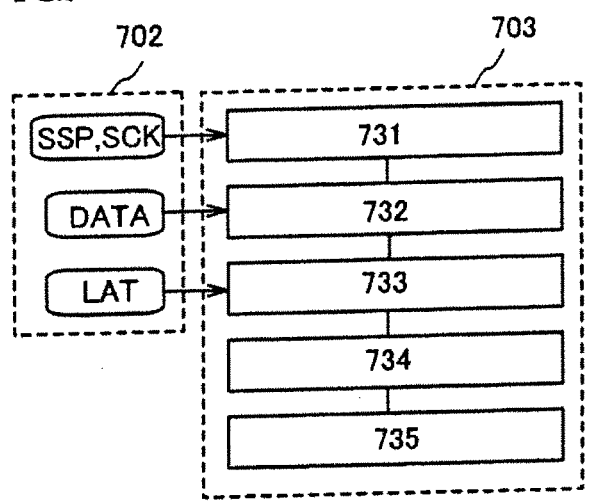

FIGS. 14A to 14C illustrate system block diagrams of a pixel portion 705 and a driver circuit portion 708 in a liquid crystal display device.

In the pixel portion 705, a plurality of pixels are included. A switching element is provided in each intersection region of signal lines 712 and scanning lines 710, which serves as a pixel. Application of voltage for controlling tilt of liquid crystal molecules can be controlled by the switching elements. Such a structure in which a switching element is provided in each intersection region is called an active matrix type. The pixel portion of the present invention is not limited to an active matrix type, and may have a passive matrix type structure instead. The passive matrix type is manufactured by a simple process because a switching element is not included in each pixel.

The driver circuit portion 708 includes a control circuit 702, a signal line driver circuit 703, and a scanning line driver circuit 704. The control circuit 702 controls a gray scale in accordance with contents to be displayed by the pixel portion 705. Therefore, the control circuit 702 inputs a generated signal to the signal line driver circuit 703 and the scanning line driver circuit 704. When a switching element is selected by the scanning line driver circuit 704 using the scanning line 710, voltage is applied to a pixel electrode in a selected intersection region. A value of this voltage is determined based on a signal inputted from the signal line driver circuit 703 through the signal line.

Further, in the control circuit 702, a signal for controlling electric power supplied to a lighting unit 706 is generated. The signal is inputted to a power supply 707 of the lighting unit 706. As the lighting unit, the back light unit described in the foregoing embodiment mode can be used. Note that the lighting unit may be a front light instead of the backlight unit. A front light is a plate-like lighting unit which includes a light emitter and a light guide body for illuminating the whole liquid crystal display device, and which is attached to a front surface side of the pixel portion. With such a lighting unit, the pixel portion can be evenly irradiated with light, with low power consumption.

As illustrated in FIG. 14B, a scanning line driver circuit 704 includes circuits serving as a shift register 741, a level shifter 742, and a buffer 743. Signals such as a gate start pulse (GSP) and a gate clock signal (GCK) are inputted to the shift register 741. Note that a structure of the scanning line driver circuit of the present invention is not limited to the structure illustrated in FIG. 14B.

As illustrated in FIG. 14C, the signal line driver circuit 703 includes circuits serving as a shift register 731, a first latch 732, a second latch 733, a level shifter 734, and a buffer 735. The circuit serving as the buffer 735 is a circuit for amplifying a weak signal and includes an operational amplifier and the like. A signal such as a start pulse (SSP), a clock signal (SCK), and the like are inputted to the shift register 731 and data (DATA) such as a video signal are inputted to the first latch 732. Latch (LAT) signals can be temporarily held in the second latch 733, and they are inputted to the pixel portion 705 at a time. Such operation is referred to as line sequential driving. If the pixels perform dot sequential driving instead of the line sequential driving, the second latch is not required. Thus, a structure of a signal line driver circuit of the present invention is not limited to the structure illustrated in FIG. 14C.

The signal line driver circuit 703, the scanning line driver circuit 704, and the pixel portion 705 as described above can be formed of semiconductor elements provided over one substrate. The semiconductor element can be formed by using a thin film transistor formed over a glass substrate. In that case, a crystalline semiconductor film may be applied to the semiconductor elements (see Embodiment Mode 4). A crystalline semiconductor film can be included in a circuit in a driver circuit portion because its electrical characteristics, in particular, the mobility, is high. Further, the signal line driver circuit 703 and the scanning line driver circuit 704 can be mounted over the substrate by using an integrated circuit (IC) chip. In that case, an amorphous semiconductor film can be applied to a semiconductor element in the pixel portion (see Embodiment Mode 5).

Accordingly, in the liquid crystal display device of this embodiment mode using the present invention, deterioration of the liquid crystal which is caused in a manufacturing process can be prevented. Further, the liquid crystal display device with good adhesion between substrates, high reliability and high image quality can be realized. Moreover, such a liquid crystal display device with high reliability and high image quality can be manufactured with high productivity.

Embodiment Mode 7

This embodiment mode describes a structure of a backlight, which is a lighting unit which can be used in a liquid crystal display device according to the present invention. A backlight is provided in a liquid crystal display device as a backlight unit having a light source. In the backlight unit, the light source is surrounded by a reflector plate so that light is scattered efficiently.

Figure 11A:
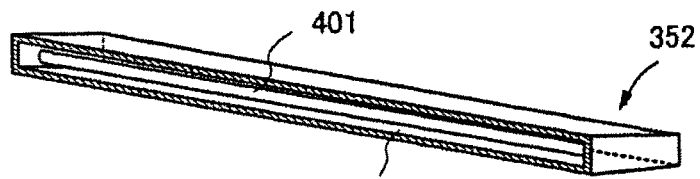
FIGS. 11A to 11D are views illustrating a backlight which can be used as a liquid crystal display device of the present invention.

As illustrated in FIG. 11A, a cold cathode tube 401 can be used as a light source in a backlight unit 352. In order to efficiently reflect light from the cold cathode tube 401, a lamp reflector 332 can be provided. The cold cathode tube 401 is mostly used for a large-sized liquid crystal display device due to high luminance from the cold cathode tube. Accordingly, the backlight unit having a cold cathode tube can be used for a display of a personal computer.

Figure 11B:
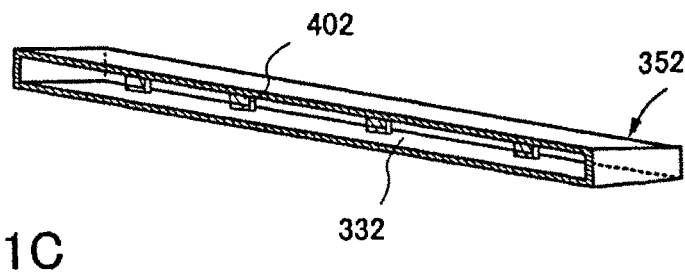

As illustrated in FIG. 11B, a light-emitting diode 402 can be used as a light source of the backlight unit 352. For example, light-emitting diodes 402 which emit white light are arranged at predetermined intervals. In order to efficiently reflect light from the light-emitting diode 402, the lamp reflector 332 can be provided.

Figure 11C:
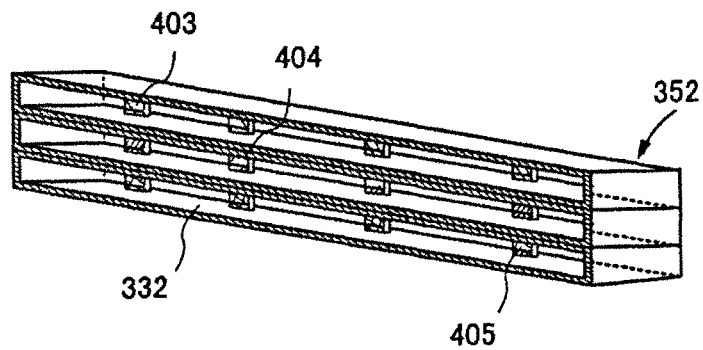

As illustrated in FIG. 11C, light-emitting diodes 403, 404, and 405 which emit light of colors of RGB can be used as a light source in the backlight unit 352. When the light-emitting diodes 403, 404, and 405 which emit light of colors of RGB are used, color reproducibility can be enhanced as compared with the case where only the light-emitting diode 402 which emits white light is used. In order to efficiently reflect light from the light emission diodes, the lamp reflector 332 can be provided.

Figure 11D:
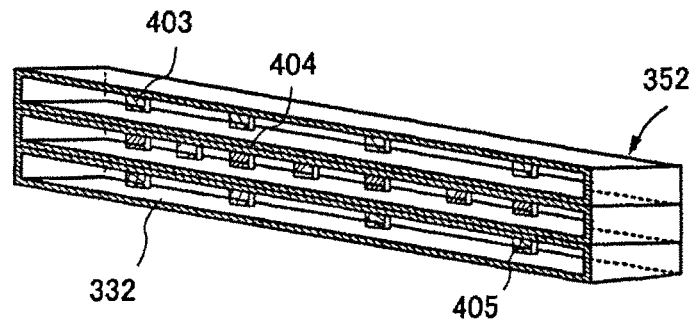

As illustrated in FIG. 11D, when the light-emitting diodes 403, 404, and 405 which emit light of colors of RGB are used as a light source, it is not necessary that the number and arrangement of the light-emitting diodes 403, 404, and 405 are the same. For example, a plurality of light-emitting diodes emitting light of a color that has low light-emitting intensity may be arranged.

Further, the light-emitting diode 402 which emits light of a white color and the light-emitting diodes 403, 404, and 405 which emit light of colors of RGB may be combined.

When a field sequential mode is applied in the case of using the light-emitting diodes of RGB, color display can be performed by sequentially lighting the light-emitting diodes of RGB in accordance with the time.

The light-emitting diode is suitable for a large-sized liquid crystal display device because the luminance thereof is high. In addition, color reproducibility of the light-emitting diode is superior to that of a cold cathode tube because the color purity of each color of RGB is favorable, and the area required can be reduced. Therefore, a narrower frame can be achieved when the light-emitting diode is applied to a small-sized liquid crystal display device.

A light source does not need to be provided as in the backlight units illustrated in FIGS. 11A to 11D. For example, when a backlight having a light-emitting diode is mounted on a large-sized liquid crystal display device, the light-emitting diode can be disposed behind the substrate. In that case, each of the light-emitting diodes can be arranged at predetermined intervals. Depending on arrangement of the light-emitting diodes, color reproducibility can be enhanced.

A liquid crystal display device using such a backlight according to the present invention can have good adhesion between substrates, high reliability and high image quality and deterioration of liquid crystal caused in a manufacturing process thereof can be prevented. Further, such a liquid crystal display device with high reliability and high image quality can be manufactured with high productivity. A backlight having a light-emitting diode is particularly suitable for a large-sized liquid crystal display device, and a high-quality image can be provided even in a dark place by enhancement of the contrast ratio of the large-sized liquid crystal display device.

This embodiment mode can be combined with any of Embodiment Modes 1 to 6 as appropriate.

Embodiment Mode 8

In this embodiment mode, an example of a liquid crystal display device in which deterioration of liquid crystal caused in a manufacturing process is prevented and which has good adhesion between substrates, high reliability and high image quality, and the manufacturing method thereof will be described. Specifically, a liquid crystal display module using the present invention will be described.

This embodiment mode will be described with reference to FIGS. 10A and 10B. FIGS. 10A and 10B illustrate a structural example of a liquid crystal display device (a liquid crystal display module) using an element substrate 2600 manufactured by application of the present invention.

FIG. 10A illustrates an example of a liquid crystal display module, in which the element substrate 2600 and a counter substrate 2601 are attached to each other with a sealant 2602 using a plurality of projections 2615a, 2615b, 2615c and 2615d, and a pixel portion 2603 including a TFT, or the like, a liquid crystal layer 2604 and a colored layer 2605 are provided therebetween to form a display region. The colored layer 2605 is necessary to perform color display. In the case of the RGB system, respective colored layers corresponding to colors of red, green, and blue are provided for corresponding pixels. The outer side of the element substrate 2600 and the counter substrate 2601 is provided with a polarizing plate 2606, a polarizing plate 2607 and a diffuser plate 2613. A light source includes a cold cathode tube 2610 and a reflector plate 2611. A circuit board 2612 is connected to the element substrate 2600 by a flexible wiring board 2609. External circuits such as a control circuit and a power supply circuit are incorporated in the circuit board 2612. The polarizing plate and the liquid crystal layer may be stacked with a retardation plate interposed therebetween.

The liquid crystal display device in FIGS. 10A and 10B is an example in which the polarizing plate 2606 are provided on an outer side of the counter substrate 2601 (a viewing side), and the colored layer 2605 are provided on an inner side of the counter substrate 2601. However, the polarizing plate 2606 may be provided on the inner side of the counter substrate 2601 (on the liquid crystal side), and the colored layer 2605 may be provided on an outer side of the counter substrate. The stacked-layer structure of the polarizing plate 2606 and the colored layer 2605 is not limited to that of FIG. 10A and may be determined as appropriate depending on materials of the polarizing plate 2606 and the colored layer 2605 or conditions of a manufacturing process.

Similarly to Embodiment Mode 1, in this embodiment mode using the present invention, a surface of an uncured sealant provided for the counter substrate 2601 is cured by the first cure treatment before dropping liquid crystal in a method for manufacturing a liquid crystal display device in which the liquid crystal is dropped by a dropping method to form the liquid crystal layer. After dropping the liquid crystal, the counter substrate 2601 and the element substrate 2600 are attached to each other with the liquid crystal interposed therebetween. Then, the sealant is subjected to a second cure treatment to be cured wholly. In the present invention, the element substrate 2600 has the plurality of projections 2615a, 2615b, 2615c, 2615d in a sealant adhesive region. The counter substrate 2601 and the element substrate 2600 are attached to each other with the liquid crystal interposed therebetween so that the plurality of projections 2615a, 2615b, 2615c and 2615d are implanted in the sealant provided for the counter substrate 2601.

Since a surface of the sealant is cured by the first cure treatment (also referred to as a temporary cure treatment), the liquid crystal is not in contact with the uncured sealant. Accordingly, contamination of the liquid crystal due to the uncured sealant can be prevented. Therefore, reduction in reliability of the liquid crystal display device caused by deterioration of the liquid crystal can be prevented. The liquid crystal display device with reduced display unevenness, a reduced display defect and high image quality can be realized.

In this embodiment mode, although the surface of the sealant is cured by the first cure treatment, an inside of the sealant is still in an uncured state in which adhesiveness is high. Since a sealant adhesive region of the element substrate 2600 is provided with the plurality of projections 2615a, 2615b, 2615c and 2615d, when the counter substrate 2601 and the element substrate 2600 are attached to each other, the plurality of projections 2615a, 2615b, 2615c and 2615d are implanted in the sealant. The projections 2615a, 2615b, 2615c and 2615d physically destroy the surface of the sealant of which adhesiveness is lowered by cure treatment and penetrate the inside of the sealant, so that the projections can be in contact with the uncured sealant with high adhesiveness. Accordingly, the second cure treatment is performed in a state where the plurality of projections 2615a, 2615b, 2615c and 2615d is implanted in the sealant 2602 and the sealant is wholly cured, whereby the counter substrate 2601 and the element substrate 2600 can be attached firmly to each other and can stick to each other. Adhesiveness between the counter substrate 2601 and the element substrate 2600 can be improved and reliability of the liquid crystal display device can be improved.

The insulating layer serving as an alignment film can be formed using polyimide, polyamide, or the like. The insulating layer can serve as the alignment film by being subjected to rubbing treatment, but it is not limited as long as the insulating layer can serve as an alignment film which aligns liquid crystal molecules in one direction. Light irradiation or heat treatment may be performed on the insulating layer to form an alignment film.

As the sealant, typically, a material containing a visible light curable resin, an ultraviolet curable resin, or a thermosetting resin can be used. For example, an epoxy resin such as a bisphenol-A liquid resin, a bisphenol-A solid resin, a bromine-containing epoxy resin, a bisphenol-F resin, a bisphenol-AD resin, a phenol resin, a cresol resin, a novolac resin, a cycloaliphatic epoxy resin, an Epi-Bis type epoxy resin, a glycidyl ester resin, a glycidyl amine resin, a heterocyclic epoxy resin, or a modified epoxy resin can be used.

When an element substrate over which a semiconductor element such as a thin film transistor is formed is used, the liquid crystal may be dropped to the element substrate. Alternatively, the sealant may be provided for a counter substrate provided with a color filter, a black matrix, or the like and the liquid crystal may be dropped to the counter substrate. Accordingly, the sealant may be provided for either the element substrate 2600 or the counter substrate 2601 and the liquid crystal may be dropped to either the element substrate 2600 or the counter substrate 2601. In this embodiment mode, since the sealant is provided for the counter substrate 2601 and the liquid crystal is dropped to the counter substrate 2601, the plurality of projections 2615a, 2615b, 2615c and 2615d is provided in the sealant adhesive region of the element substrate.

The liquid crystal display module can employ a TN (Twisted Nematic) mode, an IPS (In-Plane-Switching) mode, an FFS (Fringe Field Switching) mode, an MVA (Multi-domain Vertical Alignment) mode, a PVA (Patterned Vertical Alignment) mode, an ASM (Axially Symmetric aligned Micro-cell) mode, an OCB (Optical Compensated Birefringence) mode, an FLC (Ferroelectric Liquid Crystal) mode, an AFLC (Anti Ferroelectric Liquid Crystal) mode, or the like.

FIG. 10B illustrates an example of applying an FS method to the liquid crystal display module of FIG. 10A, so that this liquid crystal display module is an FS-LCD (Field Sequential-LCD). The FS-LCD performs red, green, and blue light emissions in one frame period. Color display can be performed by composing an image by a time division method. Also, emission of each color is performed using a light-emitting diode, a cold cathode tube, or the like; hence, a color filter is not required. There is no necessity for arranging color filters of three primary colors and limiting a display region of each color. Display of all three colors can be performed in any region. On the other hand, since light emission of three colors is performed in one frame period, high speed response of liquid crystal is needed. When an FS system is applied to the liquid crystal display device of the present invention, a liquid crystal display device or a liquid crystal television device having higher performance and high image quality can be completed.

An optical response speed of the liquid crystal display module is increased by narrowing a cell gap of the liquid crystal display module. Alternatively, the optical response speed can be increased by lowering the viscosity of the liquid crystal material. The optical response speed can be further increased by an overdrive method in which an applied voltage is increased (or decreased) only for a moment.

The liquid crystal display module of FIG. 10B is a transmissive liquid crystal display module, in which a red light source 2910a, a green light source 2910b, and a blue light source 2910c are provided as light sources. A control portion 2912 is provided for the light sources, to separately control the red light source 2910a, the green light source 2910b, and the blue light source 2910c to be turned on or off. The light emission of each color is controlled by the control portion 2912, and light enters the liquid crystal to compose an image using the time division, thereby performing color display.

Accordingly, in the liquid crystal display device of this embodiment mode using the present invention, deterioration of the liquid crystal which is caused in a manufacturing process can be prevented. Further, the liquid crystal display device with good adhesion between substrates, high reliability and high image quality can be realized. Moreover, such a liquid crystal display device with high reliability and high image quality can be manufactured with high productivity.

This embodiment mode can be combined with any of Embodiment Modes 1 to 8 as appropriate.

Embodiment Mode 9

Figure 15:
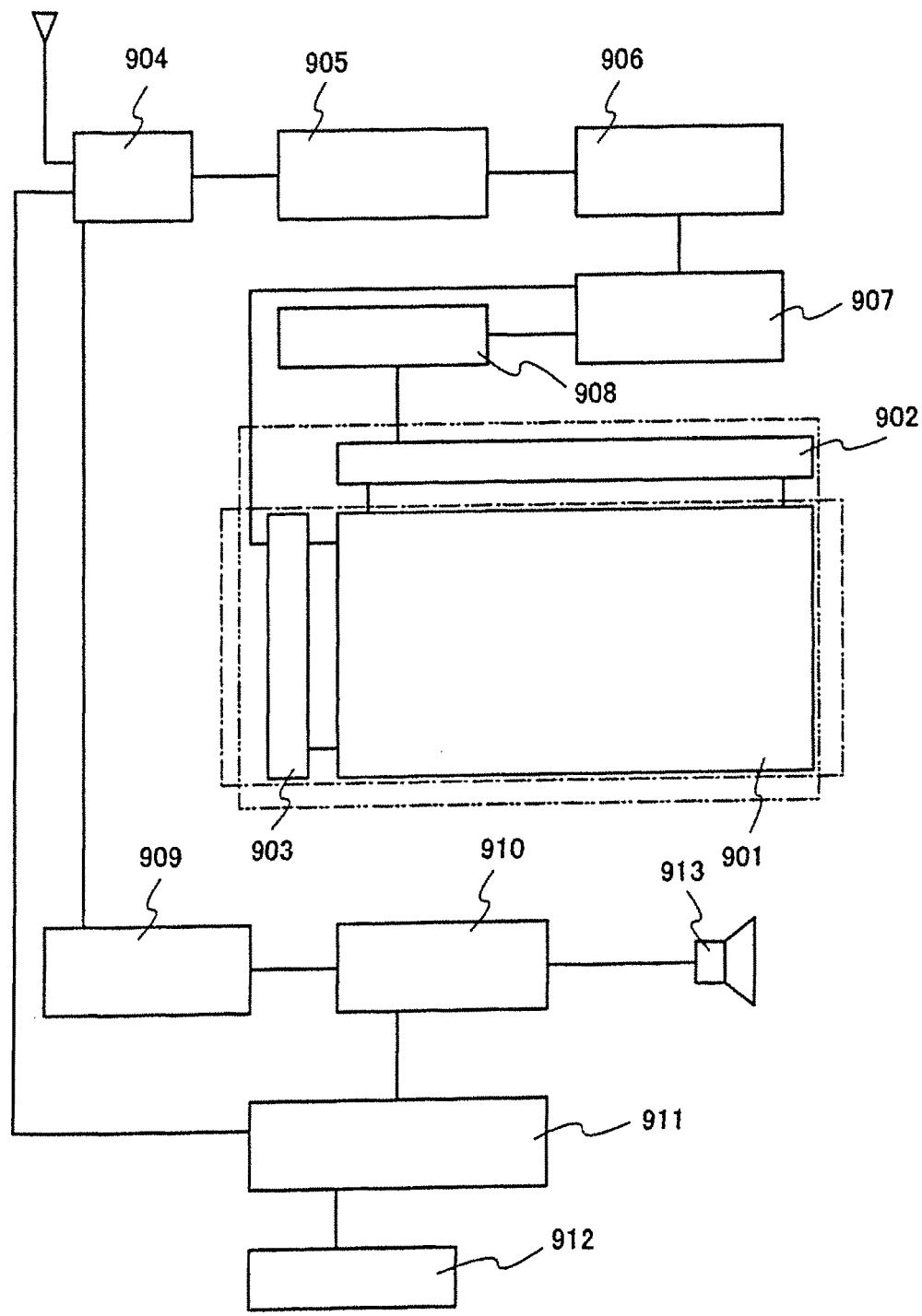
FIG. 15 is a block diagram illustrating a main structure of an electronic appliance to which the present invention is applied.

A television set (also referred to as simply a TV or a television receiver) can be completed using a liquid crystal display device formed in accordance with the present invention. FIG. 15 is a block diagram showing a main structure of a television set.

As for the display panel, there are the following cases: a case in which only a pixel portion 901 is formed as shown in FIG. 15 and a scanning line driver circuit 903 and a signal line driver circuit 902 are mounted by a TAB method as shown in FIG. 13B; a case in which the scanning line driver circuit 903 and the signal line driver circuit 902 are mounted by a COG method as shown in FIG. 13A; a case in which a TFT is formed as shown in FIG. 13B, the pixel portion 901 and the scanning line driver circuit 903 are formed over a substrate, and the signal line driver circuit 902 is separately mounted as a driver IC; a case in which the pixel portion 901, the signal line driver circuit 902, and the scanning line driver circuit 903 are formed over a substrate as shown in FIG. 12C; and the like. The display panel may have any of the structures.

As another external circuit in FIG. 15, a video signal amplifier circuit 905 which amplifies a video signal among signals received by a tuner 904, a video signal processing circuit 906 which converts the signals outputted from the video signal amplifier circuit 905 into chrominance signals corresponding to respective colors of red, green, and blue, a control circuit 907 which converts the video signal into an input specification of the driver IC, and the like are provided on an input side of the video signal. The control circuit 907 outputs signals to both a scanning line side and a signal line side. In the case of digital drive, a signal dividing circuit 908 may be provided on the signal line side and an input digital signal may be divided into m pieces and supplied.

An audio signal among signals received by the tuner 904 is sent to an audio signal amplifier circuit 909 and is supplied to a speaker 913 through an audio signal processing circuit 910. A control circuit 911 receives control information of a receiving station (reception frequency) or sound volume from an input portion 912 and transmits signals to the tuner 904 and the audio signal processing circuit 910.

Figure 16A:
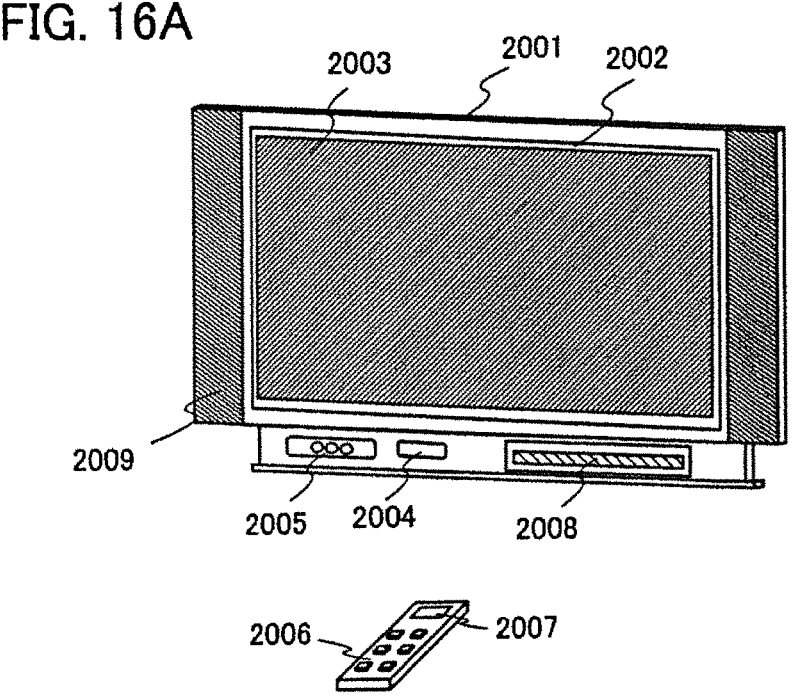
FIGS. 16A and 16B are views each illustrating an electronic appliance of the present invention.
Figure 16B:
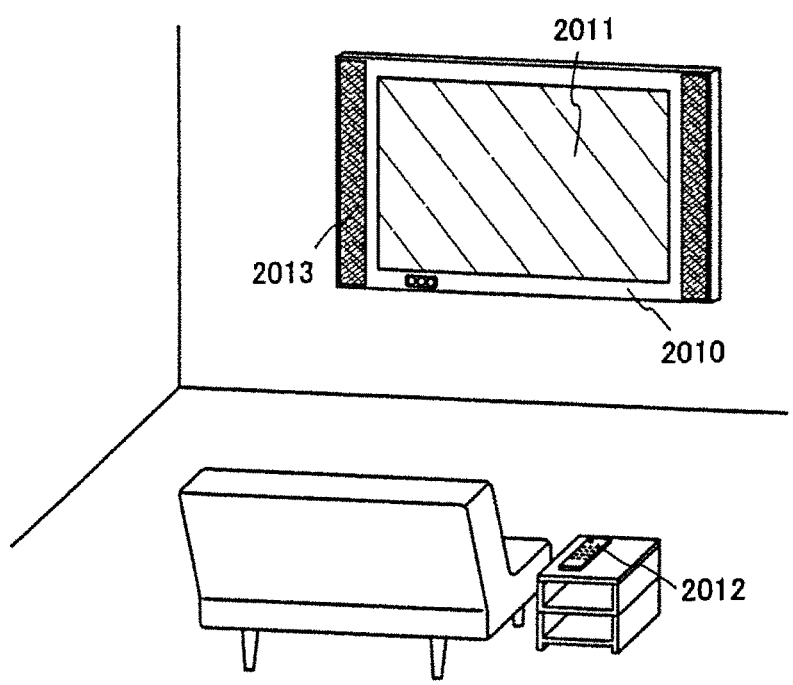

A television device can be completed by incorporating the display module into a chassis as illustrated in FIGS. 16A and 16B. When a liquid crystal display module is used as a display module, a liquid crystal television device can be manufactured. In FIG. 16A, a main screen 2003 is formed by using the display module, and a speaker portion 2009, an operation switch, and the like are provided as its accessory equipment. Thus, a television device can be completed in accordance with the present invention.

A display panel 2002 is incorporated in a chassis 2001, and general TV broadcast can be received by a receiver 2005. When the display device is connected to a communication network by wired or wireless connections via a modem 2004, one-way (from a sender to a receiver) or two-way (between a sender and a receiver or between receivers) information communication can be performed. The television device can be operated by using a switch built in the chassis 2001 or a remote control unit 2006. A display portion 2007 for displaying output information may also be provided in the remote control device 2006.

Further, the television device may include a sub screen 2008 formed using a second display panel so as to display channels, volume, or the like, in addition to the main screen 2003. In this structure, the main screen 2003 and the sub screen 2008 can be formed using the liquid crystal display device of the present invention. In accordance with the present invention, a liquid crystal display device with high reliability can be manufactured even when a large-sized substrate is used and a large number of TFTs or electronic components are used.

FIG. 16B illustrates a television device having a large-sized display portion, for example, a 20-inch to 80-inch display portion. The television device includes a chassis 2010, a display portion 2011, a remote control device 2012 that is an operation portion, a speaker portion 2013, and the like. This embodiment mode of the present invention is applied to manufacturing of the display portion 2011. Since the television device in FIG. 16B is a wall-hanging type, it does not require a large installation space.

Naturally, the present invention is not limited to the television device, and can be applied to various use applications as a large-sized display medium such as an information display board at a train station, an airport, or the like, or an advertisement display board on the street, as well as a monitor of a personal computer.

This embodiment mode can be freely combined with any of Embodiment Modes 1 to 8 as appropriate.

Embodiment Mode 10

Examples of electronic appliances in accordance with the present invention are as follows: a television device (also referred to as simply a television, or a television receiver), a digital camera, a digital video camera, a cellular telephone device (simply also referred to as a cellular phone or a cellphone), a mobile information terminal such as PDA, a portable game machine, a computer monitor, a computer, a sound reproducing device such as a car audio system, an image reproducing device including a recording medium, such as a home-use game machine, and the like. Further, the present invention can be applied to various game machines having a liquid crystal display device such as a pachinko machine, a slot machine, a pinball machine, and a large-scaled game machine. Specific examples thereof are described with reference to FIGS. 17A to 17F.

Figure 17A:
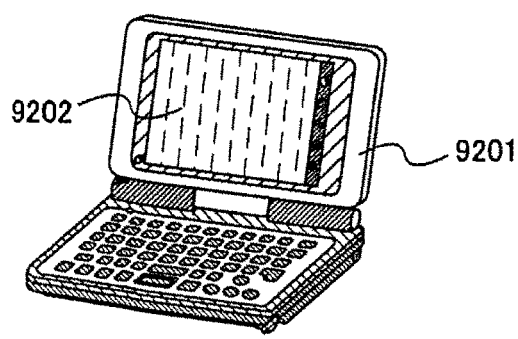
FIGS. 17A to 17F are views each illustrating an electronic appliance of the present invention.

A portable information terminal device illustrated in FIG. 17A includes a main body 9201, a display portion 9202, and the like. The liquid crystal display device of the present invention can be applied to the display portion 9202. As a result, a portable information terminal device which can display a high-quality image with high reliability can be provided.

Figure 17B:
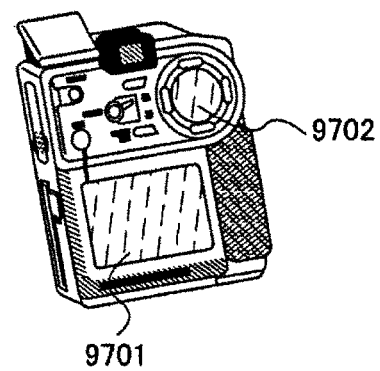

A digital video camera illustrated in FIG. 17B includes a display portion 9701, a display portion 9702, and the like. The liquid crystal display device of the present invention can be applied to the display portion 9701. As a result, a digital video camera which can display a high-quality image with high reliability can be provided.

Figure 17C:
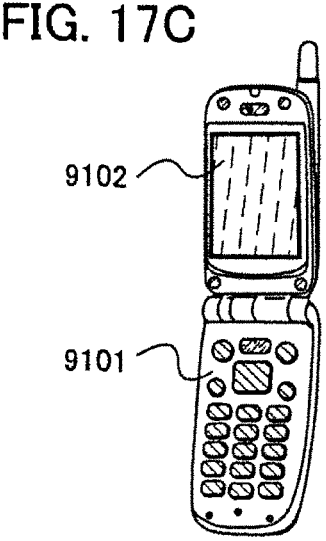

A cellular phone illustrated in FIG. 17C includes a main body 9101, a display portion 9102, and the like. The liquid crystal display device of the present invention can be applied to the display portion 9102. As a result, a cellular phone which can display a high-quality image with high reliability can be provided.

Figure 17D:
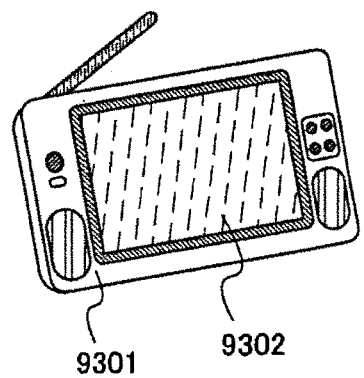

A portable television device illustrated in FIG. 17D includes a main body 9301, a display portion 9302 and the like. The liquid crystal display device of the present invention can be applied to the display portion 9302. As a result, a portable television device which can display a high-quality image with high reliability can be provided. The liquid crystal display device of the present invention can be applied to a wide range of television devices ranging from a small-sized television device mounted on a portable terminal such as a cellular phone, a medium-sized television device which can be carried, to a large-sized (for example, 40-inch or larger) television device.

Figure 17E:
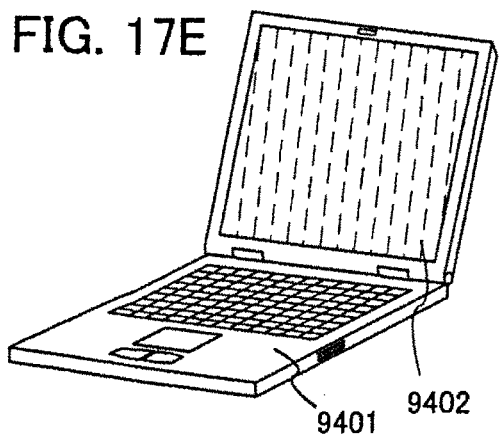

A portable computer illustrated in FIG. 17E includes a main body 9401, a display portion 9402, and the like. The liquid crystal display device of the present invention can be applied to the display portion 9402. As a result, a portable computer which can display a high-quality image with high reliability can be provided.

Figure 17F:
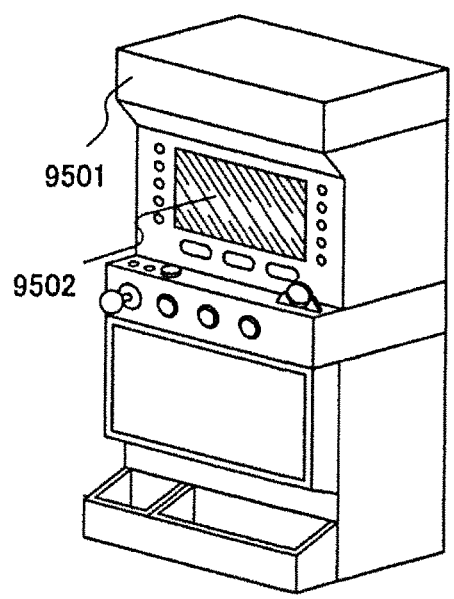

A slot machine illustrated in FIG. 17F includes a main body 9501, a display portion 9502, and the like. The liquid crystal display device of the present invention can be applied to the display portion 9502. As a result, a slot machine which can display a high-quality image with high reliability can be provided.

As described above, an electronic appliance which can display a high-quality image with high reliability can be provided by using the liquid crystal display device of the present invention.

This embodiment mode can be combined with any of Embodiment Modes 1 to 9 as appropriate.

This application is based on Japanese Patent Application serial no. 2007-116293 filed with Japan Patent Office on Apr. 26, 2007, the entire contents of which are hereby incorporated by reference.

What is claimed is:

1. A liquid crystal display device comprising:
a pair of substrates; and
a liquid crystal interposed between the pair of substrates by using a sealant,
wherein a plurality of projections provided for one of the pair of substrates penetrates inside of the sealant,
wherein the plurality of projections has a conical shape,
wherein a thickness of the sealant is greater than a height of each of the plurality of projections, and
wherein the plurality of projections comprises a conductive material.

2. The liquid crystal display device according to claim 1, wherein the sealant includes an ultraviolet curing resin.

3. The liquid crystal display device according to claim 1, wherein the sealant includes a thermosetting resin.

4. A liquid crystal display device comprising:
a first substrate having a pixel region and a sealant adhesive region;
a second substrate having a counter electrode;
the pixel region comprising:
a thin film transistor;
an insulating film over the thin film transistor;
a pixel electrode over the insulating film, the pixel electrode being electrically connected to the thin film transistor; and
a liquid crystal between the pixel electrode and the counter electrode;
the sealant adhesive region comprising:
a sealant; and
a plurality of projections which penetrates inside of the sealant,
wherein the plurality of projections has a conical shape,
wherein a thickness of the sealant is greater than a height of each of the plurality of projections, and
wherein the plurality of projections comprises a conductive material.

5. The liquid crystal display device according to claim 4, wherein the sealant includes an ultraviolet curing resin.

6. The liquid crystal display device according to claim 4, wherein the sealant includes a thermosetting resin.

7. A liquid crystal display device comprising:
a pair of substrates; and
a liquid crystal interposed between the pair of substrates by using a sealant,
wherein a projection provided for one of the pair of substrates penetrates inside of the sealant,
wherein the projection has a conical shape,
wherein a thickness of the sealant is greater than a height of the projection, and
wherein the projection comprises a conductive material.

8. The liquid crystal display device according to claim 7, wherein the sealant includes an ultraviolet curing resin.

9. The liquid crystal display device according to claim 7, wherein the sealant includes a thermosetting resin.

* * * * *